United States Patent
Kawamoto et al.

(10) Patent No.: US 9,091,564 B2
(45) Date of Patent: Jul. 28, 2015

(54) INFORMATION PROCESSING APPARATUS, INFORMATION PROCESSING METHOD, AND PROGRAM

(75) Inventors: Kenta Kawamoto, Tokyo (JP); Hirotaka Suzuki, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 420 days.

(21) Appl. No.: 13/564,205

(22) Filed: Aug. 1, 2012

(65) Prior Publication Data
US 2013/0054046 A1 Feb. 28, 2013

(30) Foreign Application Priority Data
Aug. 23, 2011 (JP) .................................. 2011-181169

(51) Int. Cl.
| G05D 11/00 | (2006.01) |
| G01D 4/00 | (2006.01) |
| G06Q 50/06 | (2012.01) |
| H02J 3/00 | (2006.01) |

(52) U.S. Cl.
CPC .................. *G01D 4/00* (2013.01); *G06Q 50/06* (2013.01); *H02J 3/00* (2013.01); *H02J 2003/003* (2013.01); *H02J 2003/007* (2013.01); *Y02B 90/245* (2013.01); *Y02E 60/76* (2013.01); *Y04S 10/54* (2013.01); *Y04S 10/60* (2013.01); *Y04S 20/38* (2013.01); *Y04S 20/40* (2013.01); *Y04S 40/22* (2013.01)

(58) Field of Classification Search
USPC .............................. 700/297; 84/613; 709/221
See application file for complete search history.

(56) References Cited

U.S. PATENT DOCUMENTS

| 2009/0094353 | A1* | 4/2009 | Isobe ........................... 709/221 |
| 2010/0170382 | A1* | 7/2010 | Kobayashi ..................... 84/613 |
| 2011/0191782 | A1* | 8/2011 | Kim et al. ..................... 718/104 |
| 2012/0029720 | A1* | 2/2012 | Cherian et al. ................ 700/297 |
| 2012/0316697 | A1* | 12/2012 | Boardman et al. ............. 700/297 |
| 2013/0007088 | A1* | 1/2013 | Alfredo et al. ................ 709/201 |

FOREIGN PATENT DOCUMENTS

JP   2008-039492   2/2008

OTHER PUBLICATIONS

Shinkichi Inagi et al.; Nonintrusive Appliance Load Monitoring System—Discrete Operating Conditions and Integer Programming; 42 Dispersion Event System Research Meeting in Measurement Automation Control Society; pp. 33-38; Dec. 20, 2008 Oosaka University.

* cited by examiner

*Primary Examiner* — Robert Fennema
*Assistant Examiner* — Anthony Whittington
(74) *Attorney, Agent, or Firm* — Hazuki International, LLC

(57) ABSTRACT

There is provided an information processing apparatus including: an appliance power consumption estimating unit estimating power consumption of each of a plurality of appliances disposed inside a large region that is divided into a plurality of regions; an appliance presence probability estimating unit estimating appliance presence probabilities that are probabilities that the respective appliances are present in the respective regions; a responsible share deciding unit deciding responsible shares that are proportions for respective people when power consumption in each region is shared among people who may be present in the large region; and a power consumption allocating unit calculating an allocated amount of power consumption of each person based on the power consumption of each of the plurality of appliances, the appliance presence probabilities, and the responsible shares.

9 Claims, 16 Drawing Sheets

FIG.5

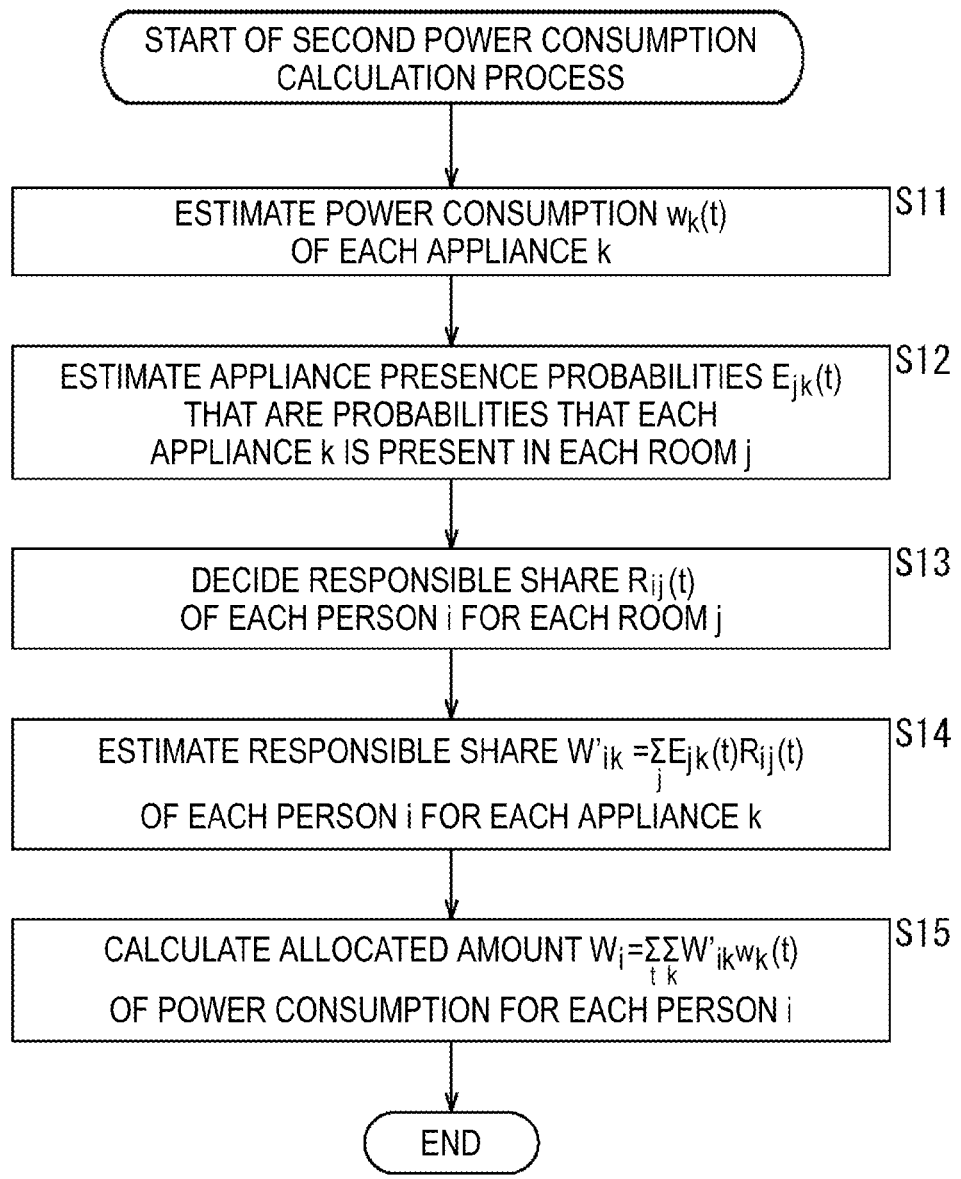

START OF SECOND POWER CONSUMPTION CALCULATION PROCESS

S11 ESTIMATE POWER CONSUMPTION $w_k(t)$ OF EACH APPLIANCE k

S12 ESTIMATE APPLIANCE PRESENCE PROBABILITIES $E_{jk}(t)$ THAT ARE PROBABILITIES THAT EACH APPLIANCE k IS PRESENT IN EACH ROOM j

S13 DECIDE RESPONSIBLE SHARE $R_{ij}(t)$ OF EACH PERSON i FOR EACH ROOM j

S14 ESTIMATE RESPONSIBLE SHARE $W'_{ik} = \sum_j E_{jk}(t) R_{ij}(t)$ OF EACH PERSON i FOR EACH APPLIANCE k S15 CALCULATE ALLOCATED AMOUNT $W_i = \sum_t \sum_k W'_{ik} w_k(t)$ OF POWER CONSUMPTION FOR EACH PERSON i

END

FIG.13
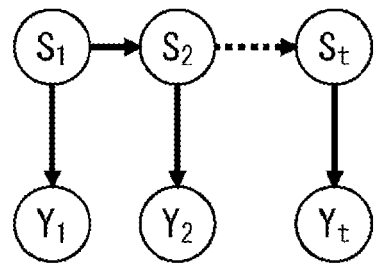
REGULAR HMM
A
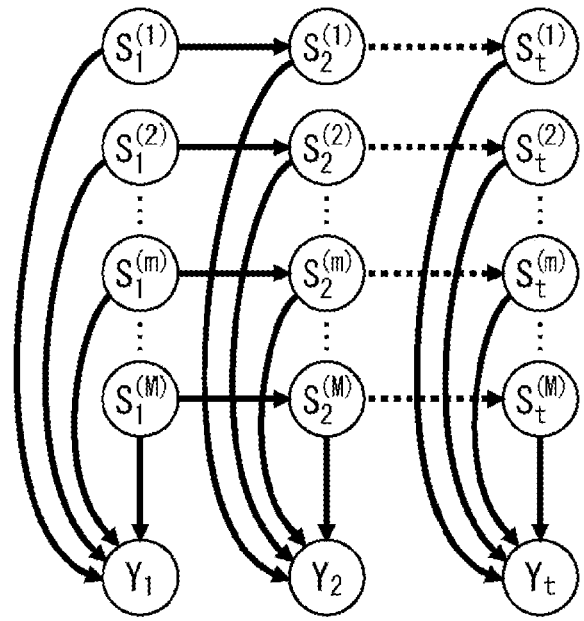
Factorial HMM
B

INFORMATION PROCESSING APPARATUS, INFORMATION PROCESSING METHOD, AND PROGRAM

BACKGROUND

The present disclosure relates to an information processing apparatus, an information processing method, and a program. In particular, the present disclosure relates to an information processing apparatus, an information processing method, and a program that enable the power consumption of respective appliances for respective people to be calculated from the overall power consumption of a plurality of appliances.

A system that measures a current waveform at a single location on a power switchboard, which is a source of supplied power in the home, using a clamp-type ammeter and monitors the usage states (on/off states) of a plurality of electrical appliances connected downstream of the power switchboard has been proposed (see, for example, Japanese Laid-Open Patent Publication No. 2008-039492 and "Non-Intrusive Type Operation State Monitoring System for Electric Appliances—Solution Based on Integer Programming with Attention Directed to Discrete States of Operation", Proceedings of 42th Workshop on Discrete Event Systems, The Society of Instrument and Control Engineers, pp. 33-38, Dec. 20, 2008, Osaka University (hereinafter referred to as Non-Patent Document 1).

The aim of visualizing the usage states of respective electrical appliances in the home is to reduce power usage or suppress the peak power by enabling users to understand how they are using power.

SUMMARY

However, unless it is possible to show specifically "who" used "what appliance" and "by how much", individual users will be given little idea of how to improve their usage of electrical appliances and will have little motivation to save power.

The present disclosure aims to make it possible to calculate the power consumption of respective appliances for respective people from the overall power consumption of a plurality of appliances.

According to an embodiment of the present disclosure, there is provided an information processing apparatus including an appliance power consumption estimating unit estimating power consumption of each of a plurality of appliances disposed inside a large region that is divided into a plurality of regions, an appliance presence probability estimating unit estimating appliance presence probabilities that are probabilities that the respective appliances are present in the respective regions, a responsible share deciding unit deciding responsible shares that are proportions for respective people when power consumption in each region is shared among people who may be present in the large region, and a power consumption allocating unit calculating an allocated amount of power consumption of each person based on the power consumption of each of the plurality of appliances, the appliance presence probabilities, and the responsible shares.

According to an embodiment of the present disclosure, there is provided an information processing method including estimating power consumption of each of a plurality of appliances disposed inside a large region that is divided into a plurality of regions, estimating appliance presence probabilities that are probabilities that the respective appliances are present in the respective regions, deciding responsible shares that are proportions for respective people when power consumption in each region is shared among people who may be present in the large region, and calculating an allocated amount of power consumption of each person based on the power consumption of each of the plurality of appliances, the appliance presence probabilities, and the responsible shares.

According to an embodiment of the present disclosure, there is provided a program causing a computer to execute processing including estimating power consumption of each of a plurality of appliances disposed inside a large region that is divided into a plurality of regions, estimating appliance presence probabilities that are probabilities that the respective appliances are present in the respective regions, deciding responsible shares that are proportions for respective people when power consumption in each region is shared among people who may be present in the large region, and calculating an allocated amount of power consumption of each person based on the power consumption of each of the plurality of appliances, the appliance presence probabilities, and the responsible shares.

According to an embodiment of the present disclosure, power consumption of each of a plurality of appliances disposed inside a large region that is divided into a plurality of regions is estimated, appliance presence probabilities that are probabilities that the respective appliances are present in the respective regions are estimated, responsible shares that are proportions for respective people when power consumption in each region is shared among people who may be present in the large region are decided, and an allocated amount of power consumption of each person based on the power consumption of each of the plurality of appliances, the appliance presence probabilities, and the responsible shares is calculated.

Note that the program can be provided by being transferred via a transfer medium or by being recorded on a recording medium.

The information processing apparatus may be an independent apparatus or may be an internal block that constructs an apparatus.

According to an embodiment of the present disclosure, it is possible to calculate the power consumption of respective appliances for respective people from the overall power consumption of a plurality of appliances.

BRIEF DESCRIPTION OF THE DRAWINGS

FIG. 5 is a flowchart useful in explaining the second power consumption calculation method;

FIG. 13 is a diagram useful in explaining a power consumption estimating technique that uses factorial HMM;

DETAILED DESCRIPTION OF THE EMBODIMENT(S)

Figure 1:
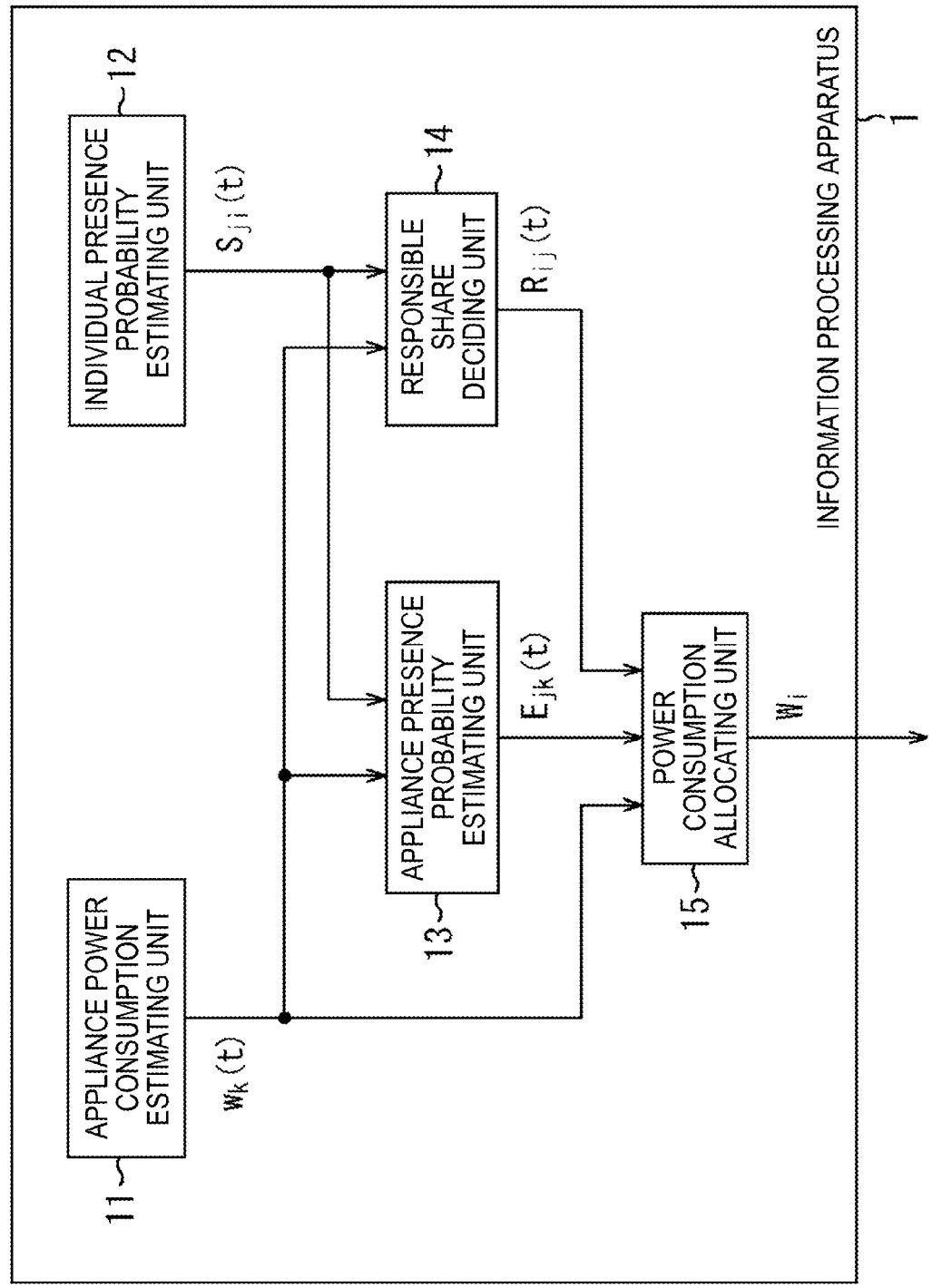
FIG. 1 is a block diagram showing one example configuration of an information processing apparatus according to an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Preferred embodiments of the present disclosure will now be described in the order indicated below.
1. Example Configuration of Information Processing Apparatus
2. Method of Calculating Power Consumption $W_i$ of Individual i (First and Second Calculation Methods)
3. Method of Calculating Power Consumption $w_k(t)$
4. Method of Calculating Individual Presence Probability $S_{ji}(t)$
5. Method of Calculating Appliance Presence Probability $E_{jk}(t)$
6. Method of Calculating Responsible Share $R_{ij}(t)$
7. Example of Power Consumption Estimating Technique Example Configuration of Information Processing Apparatus FIG. 1 is a block diagram showing an example configuration of an information processing apparatus according to an embodiment of the present disclosure.

The information processing apparatus 1 shown in FIG. 1 carries out processing that determines and outputs (presents), for each of a plurality of individuals (users) who are active in a large region divided into a plurality of small regions, power consumption for each appliance (electrical appliance) out of a plurality of appliances disposed in the large region and power consumption for each region.

In other words, the information processing apparatus 1 calculates and outputs "who" used "what appliance" and "by how much" (i.e., how much power was consumed) for each of a plurality of individuals (users) who are active in a large region that is divided into a plurality of small regions.

Here, the relationship between the large region and the small region corresponds, for the case of a house, to the relationship between the entire home (house), and the respective rooms, such as the living room, the kitchen, and the study, and, for the case of an office, to the relationship between the entire space of a company and small spaces produced by dividing into departments or the like. For ease of understanding, the following describes, for an example of a home, a case where the amount of usage of individual appliances k (where k=1 to K) by individual members i (where i=1 to I) of the family is calculated for a particular home (house). The individual members i of the family may be the father, the mother, and a child, and in the following description are referred to simply as the person i or the individual i. It is also assumed that there are J rooms (where J>2) in the house and that so long as they do not go out, the members i of the family are present in one of the rooms 1 to J.

If, at a certain time t, it were possible to acquire information showing a relationship between people and appliances indicating who is using a specified appliance k, it would be easy to calculate "who" is using "what appliance" and "by how much". However, it is not realistic to identify the user of every appliance in the home. For this reason, the information processing apparatus 1 uses a configuration where it is possible to calculate the power consumption of each person even if it is not possible to obtain information showing the relationship between people and appliances. Hereinafter, a specific configuration of the information processing apparatus 1 will be described.

The information processing apparatus 1 includes an appliance power consumption estimating unit 11, an individual presence probability estimating unit 12, an appliance presence probability estimating unit 13, a responsible share deciding unit 14, and a power consumption allocating unit 15.

The appliance power consumption estimating unit 11 estimates the power consumption $w_k(t)$ at the time t of the appliance k in the home. The estimation result is supplied to at least the power consumption allocating unit 15 and is supplied as necessary to the appliance presence probability estimating unit 13 and the responsible share deciding unit 14. Note that one out of the K appliances is a background error produced by gathering together the total power consumption of a plurality of appliances for which individual measurement of power consumption is difficult, due to reasons such as the power consumption being extremely low. That is, the appliance power consumption estimating unit 11 calculates the power consumption by also regarding the background error as one appliance.

The individual presence probability estimating unit 12 calculates the individual presence probability $S_{ij}(t)$ that is the probability that a person i (where i=1 to 1) is present in a room j (where j=1 to J) at time t and supplies the calculation results to one or both of the appliance presence probability estimating unit 13 and the responsible share deciding unit 14.

The appliance presence probability estimating unit 13 estimates the appliance presence probability $E_{jk}(t)$ that is the probability that an appliance k (where k=1 to K) is present in the room j at time t and supplies the calculation results to the power consumption allocating unit 15. Note that the total of the appliance presence probabilities $E_{jk}(t)$ for all of the rooms 1 to J at time t is 1.

$$\sum_j E_{jk}(t) = 1$$

The responsible share deciding unit 14 decides the responsible share $R_{ij}(t)$ that is the person i's proportion or share of the power consumed in the room j at time t as the responsibility of each person in the home and supplies the calculation results to the power consumption allocating unit 15. The total of the responsible shares $R_{ij}(t)$ of every member of the family at time t is 1.

$$\sum_i R_{ij}(t) = 1$$

The power consumption allocating unit 15 calculates, according to Equation (1), the power consumption $W_i$ that is the amount of the total power consumption $\Sigma w_k(t)$ in the home in a specified period T (where t=1 to T) that has been allocated to a certain individual i in the home.

$$W_i = \sum_t \sum_j \sum_k R_{ij}(t) E_{jk}(t) w_k(t) \qquad (1)$$

That is, the power consumption $W_i$ of an individual i is found by integrating, for the individual i, the power consumption $w_k(t)$ and appliance presence probability $E_{jk}(t)$ of an appliance k and the responsible share $R_{ij}(t)$ for the room j for such appliance presence probability $E_{jk}(t)$ for every appliance and for every room in the specified period T. Also, the power consumption $W_i$ of a specified appliance k for an individual i can be found by setting the summation ($\Sigma$) of all of the appliances 1 to K in Equation (1) for only a specified appliance k. Accordingly, it is possible to calculate the power consumption $W_i$ of the appliance k for the individual i.

As can be understood from Equation (1), when finding the power consumption $W_i$ of the individual i, the responsible share $R_{ij}(t)$ of a person i in the room j that shows the relationship between the person i and the room (location) j and the appliance presence probability $E_{jk}(t)$ of the appliance k in the room j showing the relationship between the appliance k and the room (location) j are used. In other words, the power consumption allocating unit 15 finds the power consumption $W_i$ of the individual i without using information showing the relationship between people and appliances. In this way, even if it is not possible to obtain information showing the relationship between people and appliances, it is still possible to find the power consumption $W_i$ of the individual i by introducing the parameter of "location".

The specified period T may be a range with a clearly defined start and end such as one day or one month or may be a period that moves in accordance with the present time, such as last 24 hours or last 30 days (calculated from the present time).

The power consumption $W_i$ of the individual i calculated by the power consumption allocating unit 15 of the information processing apparatus 1 configured as described above is outputted for example to an external display and displayed. The information processing apparatus 1 itself may be equipped with a display unit and display the power consumption Wi.

Method of Calculating Power Consumption $W_i$ of Individual i

As described earlier, although the power consumption $W_i$ of the individual i is obtained from Equation (1), as the actual method of calculating Equation (1), at least a first and second calculation method can be conceived based on the two approaches described below.

First Calculation Method

Figure 2:
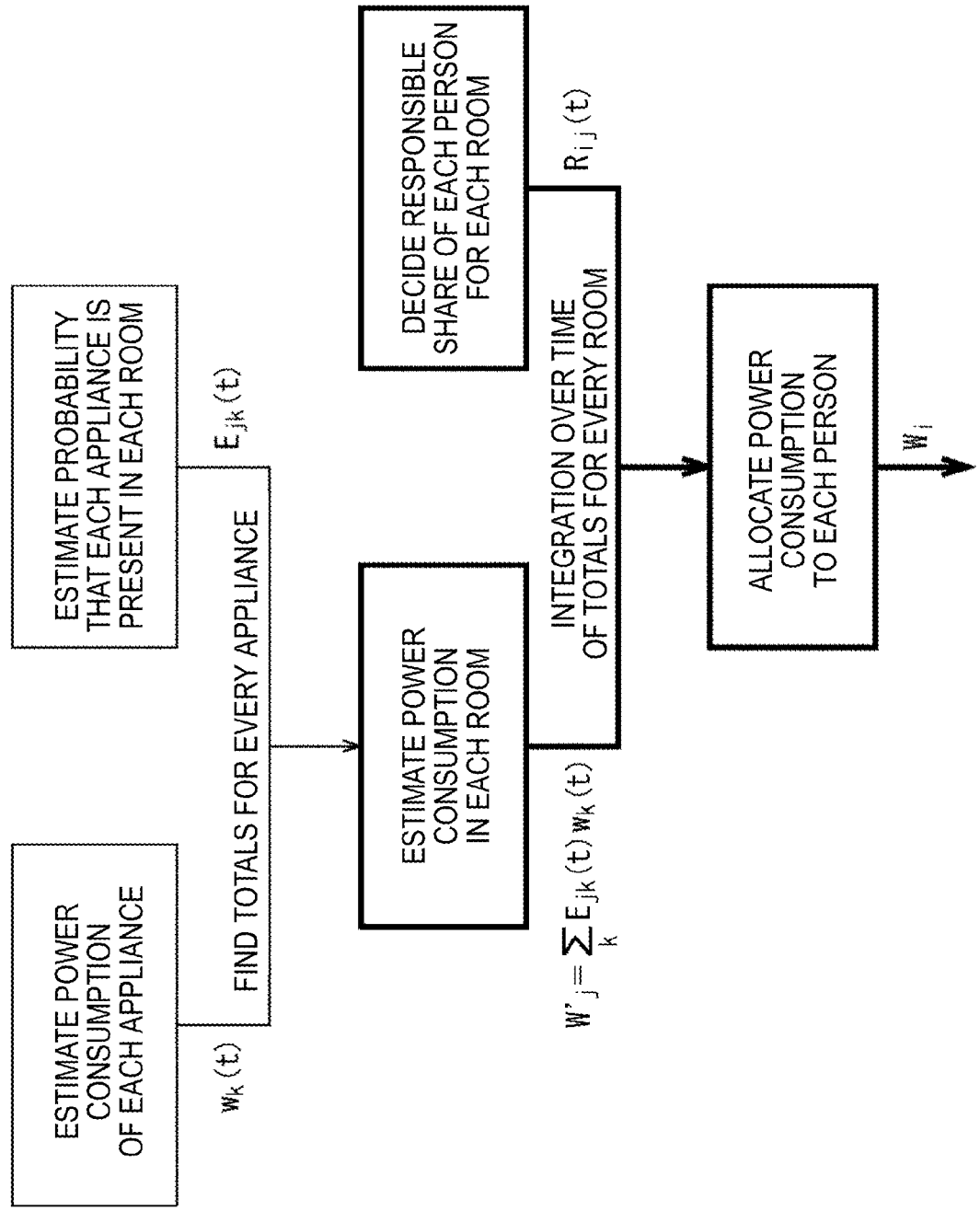
FIG. 2 is a schematic diagram useful in explaining a first calculation method that finds the power consumption of an individual.

FIG. 2 is a schematic diagram of the first calculation method that finds the power consumption $W_i$ of the individual i.

The first calculation method breaks down the power consumption $\Sigma w_k(t)$ of every appliance into room j units and assigns the power consumption $W'_j$ in room j units to each person i.

That is, by finding a total, for all the appliances 1 to K, of values produced by multiplying the power consumption $w_k(t)$ of each appliance k by the appliance presence probability $E_{jk}(t)$ of such appliance k in a room j, the power consumption $W'_j$ for each room j is calculated. Also, the responsible share $R_{ij}(t)$ of each person for each room j is decided. After this, by finding the power consumption that corresponds to the responsible share $R_{ij}(t)$ of such person i out of the power consumption $W'_j$ for each room j and integrating such values for every room, the power consumption $W_i$ of the individual i is found.

A modification to Equation (1) in keeping with the first calculation method can be expressed as shown by Equation (2) below.

$$W_i = \sum_t \sum_j W'_j \times R_{ij}(t) \qquad (2)$$

$$= \sum_t \sum_j \sum_k E_{jk}(t) w_k(t) R_{ij}(t)$$

A first power consumption calculation process that finds the power consumption $W_i$ of the individual i according to the first calculation method will now be described with reference to the flowchart in FIG. 3.

First, in step S1, the appliance power consumption estimating unit 11 estimates the power consumption $w_k(t)$ of each appliance k.

In step S2, the appliance presence probability estimating unit 13 estimates appliance presence probabilities $E_{jk}(t)$ that are probabilities that each appliance k is present in each room j.

In step S3, the power consumption allocating unit 15 estimates the power consumption $W'_j$ for each room j by calculating a sum of products for the power consumption $w_k(t)$ of each appliance k and the appliance presence probability $E_{jk}(t)$ of each appliance k in each room j.

In step S4, the responsible share deciding unit 14 decides the responsible shares $R_{ij}(t)$ of each individual i for each room j. The processing in step S3 and step S4 may be executed in the opposite order or can be executed at the same time.

In step S5, the power consumption allocating unit 15 calculates the allocated amount $W_i$ of the power consumption of each person i. More specifically, the power consumption allocating unit 15 finds a power consumption corresponding to the responsible share $R_{ij}(t)$ of the person i out of the power consumption $W'_j$ for each room j, and calculates the allocated amount $W_i$ of the power consumption for each person i by integrating such power consumption for all of the rooms 1 to J.

The allocated amount $W_i$ of the power consumption for each person i calculated in step S5 is outputted as the power consumption $W_i$ of the individual i and the processing ends.

Second Calculation Method

Figure 4:
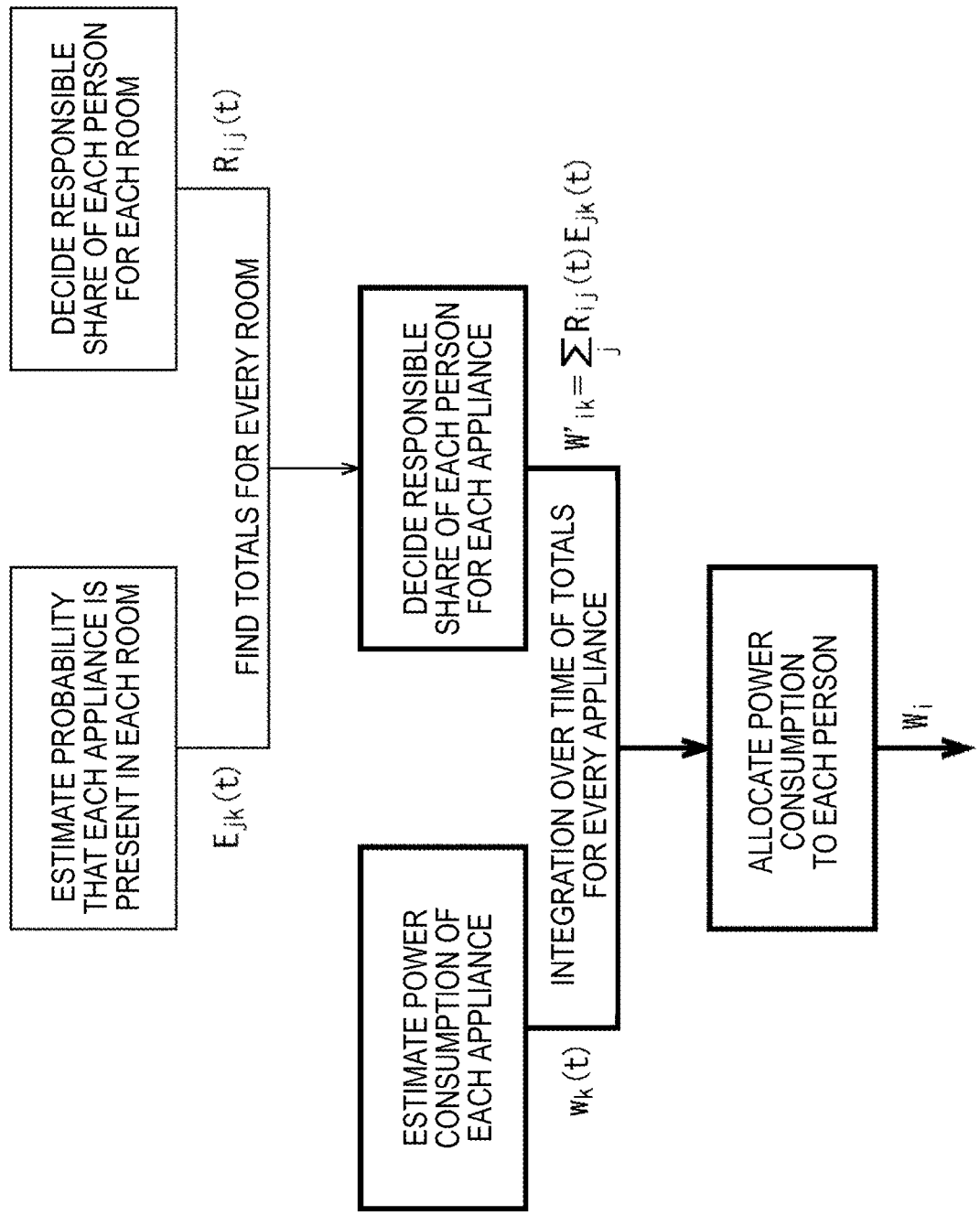
FIG. 4 is a schematic diagram useful in explaining a second calculation method that finds the power consumption of an individual.

Next, the second calculation method that finds the power consumption $W_i$ of the individual i will be described. FIG. 4 is a schematic diagram of the second calculation method.

The second calculation method calculates the power consumption $W_i$ of the individual i by assigning the power consumption $w_k(t)$ in appliance k units to each person i. The power consumption $w_k(t)$ in appliance k units can be found by the appliance power consumption estimating unit 11.

First, the information processing apparatus 1 decides the responsible share $W'_{ik}$ of each person i for each appliance k. The responsible share $W'_{ik}$ of each person i for each appliance k is found by summing, for every room 1 to J, the results of multiplying the appliance presence probability $E_{jk}(t)$ of each appliance k in each room j by the responsible share $R_{ij}(t)$ of each person i for each room j. After this, by integrating, for every appliance k, amounts corresponding to the responsible share $W'_{ik}$ of each person i out of the power consumption $w_k(t)$ of an appliance k the power consumption Wi of the individual i is found.

A modification to Equation (1) in keeping with the second calculation method can be expressed as shown by Equation (3) below.

$$W_i = \sum_t \sum_k W'_{ik} \times w_k(t) \qquad (3)$$
$$= \sum_t \sum_k \sum_j E_{jk}(t) R_{ij}(t) w_k(t)$$

A second power consumption calculation process that finds the power consumption $W_i$ of the individual i according to the second calculation method will now be described with reference to the flowchart in FIG. 5.

First, in step S11, the appliance power consumption estimating unit 11 estimates the power consumption $w_k(t)$ of each appliance k.

In step S12, the appliance presence probability estimating unit 13 estimates the appliance presence probabilities $E_{jk}(t)$ that are probabilities that each appliance k is present in each room j.

In step S13, the responsible share deciding unit 14 decides the responsible shares $R_{ij}(t)$ of each person i for each room j.

In step S14, the power consumption allocating unit 15 estimates the responsible share $W'_{ik}$ of each person i for each appliance k.

In step S15, the power consumption allocating unit 15 calculates the allocated amount $W_i$ of the power consumption for each person i. By integrating, for every room 1 to J, the results of multiplying the appliance presence probability $E_{jk}(t)$ of each appliance k in each room j by the responsible share $R_{ij}(t)$ of each person i for each room j, the power consumption allocating unit 15 calculates the allocated amount $W_i$ of the power consumption for each person i.

The allocated amount $W_i$ of the power consumption for each person i calculated in step S15 is outputted as the power consumption $W_i$ of each individual i and the processing ends.

3. Method of Calculating Power Consumption $w_k(t)$

Next, specific methods for calculating the power consumption $w_k(t)$, the individual presence probability $S_{ji}(t)$, the appliance presence probability $E_{jk}(t)$, and the responsible share $R_{ij}(t)$ will be described.

First, the method of calculating the power consumption $w_k(t)$ of the appliance k at time t carried out by the appliance power consumption estimating unit 11 will be described.

The power consumption wk(t) of the appliance k at time t can be calculated according to any of (1.1) to (1.5) below.

(1.1) Measurement by Monitoring Apparatus Incorporated in Appliance k

Figure 6:
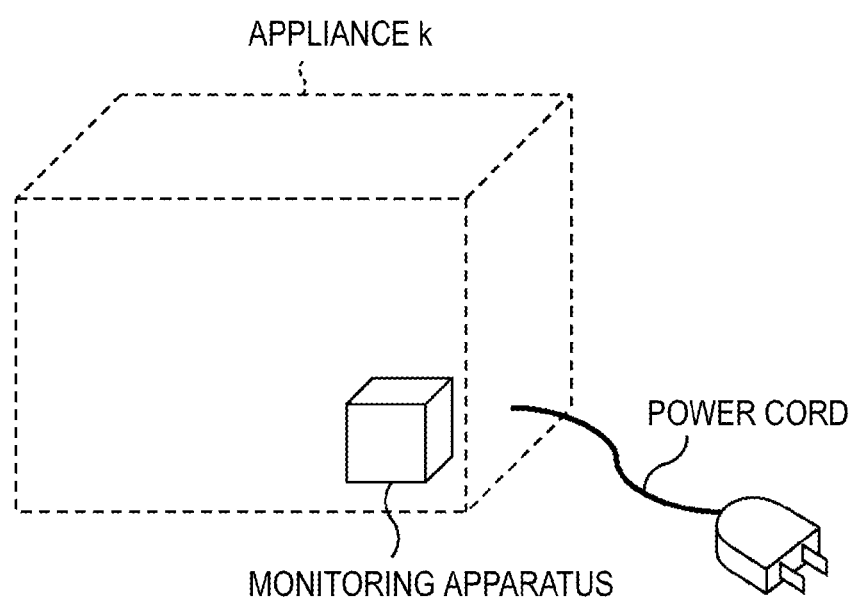
FIG. 6 is a diagram useful in explaining an example of a calculation method for power consumption.

As shown in FIG. 6, a monitoring apparatus that measures the power consumption at time k in real time and transmits the measurement result wirelessly or via wires to the information processing apparatus 1 is incorporated in each appliance k so that the power consumption $w_k(t)$ of each appliance k can be measured using such monitoring apparatuses. The measurement results may be transmitted in real time to the information processing apparatus 1 or may be appended with time information and collectively transmitted in specified units. The communication between the appliance k and the information processing apparatus 1 may use ZigBee (registered trademark) that is one example of a short-range wireless communication standard for home appliances.

Note that appliances k not equipped with a monitoring appliance 31 can be treated as part of the background error produced by subtracting the known power of the appliances k equipped with the monitoring apparatuses 31 from the total power consumption in the home. The power consumption corresponding to the background error may be fixed so as to be equally divided among all of the members of the family or proportions for sharing out the background error may be dynamically decided.

(1.2) Measurement by External Monitoring Apparatus

Figure 7:
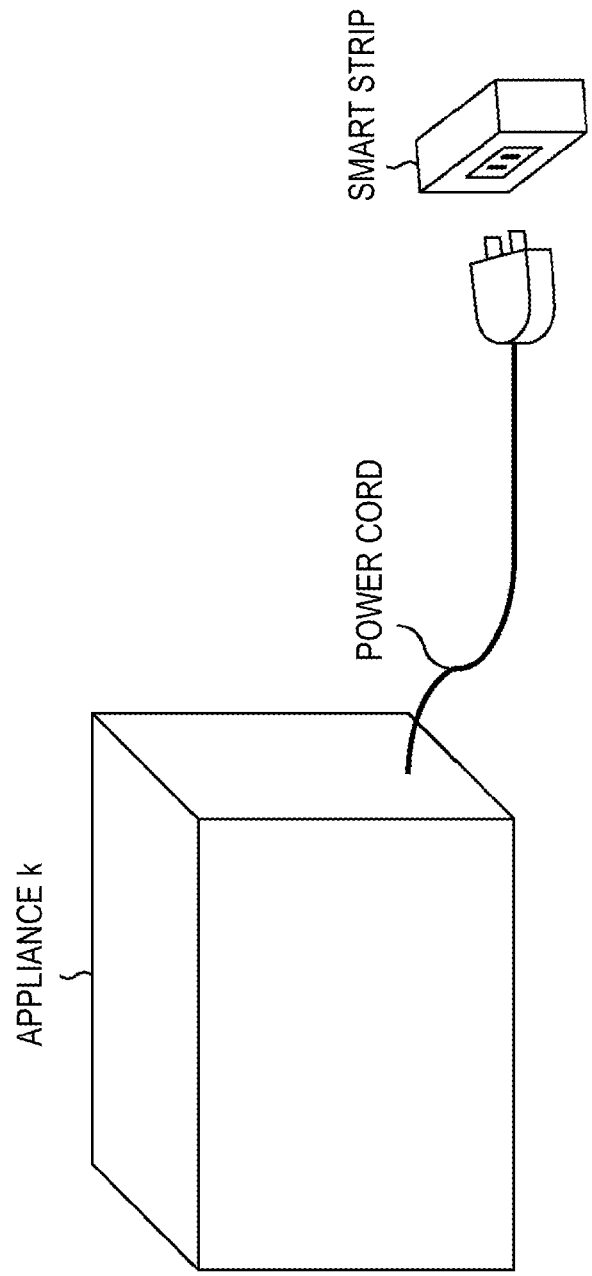
FIG. 7 is a diagram useful in explaining an example of a calculation method for power consumption.
Figure 8:
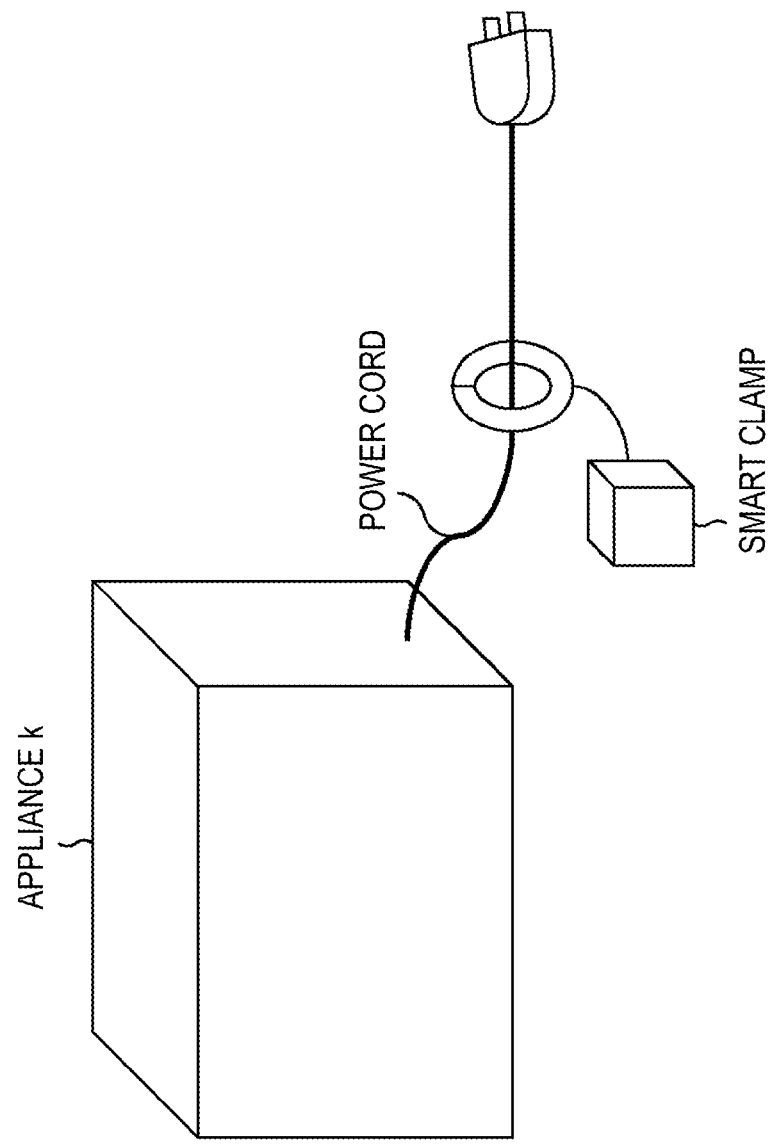
FIG. 8 is a diagram useful in explaining an example of a calculation method for power consumption.

It is also possible to measure power consumption using a "smart strip", which is a power strip equipped with a function for measuring power consumption such as that shown in FIG. 7, or a "smart clamp" (or clamp meter) that measures power by being clamped onto a power cord of the appliance k as shown in FIG. 8. Such smart strip or smart clamp can also transmit the measurement results to the information processing apparatus 1 wirelessly or via wires using a communication function such as Zigbee (registered trademark) mentioned above. In the same way as in (1.1) described above, appliances k that are not attached to a smart strip can be treated as the background error.

(1.3) Measurement by Power Consumption Estimating Technique

There is also a technique that has a smart clamp clamped onto one location of a power switchboard, which is the source of power supplied to the home, to measure the total consumption current and estimates the on/off state and power consumption of each connected appliance k in the home from the measurement result. By using this power consumption estimating technique, it is possible to measure the power consumption $w_k(t)$ of each appliance k. Examples of such power consumption estimating techniques include a method that solves an integer quadratic programming problem described in Non-Patent Document 1 mentioned above and a method that generates and solves a factorial HMM (Hidden Markov Model). A method that generates and solves a factorial HMM (Hidden Markov Model) will be described later.

(1.4) Combination of Above Methods

It is also possible to measure the power consumption $w_k(t)$ of each appliance k by combining two or more of measurement by an internal monitoring apparatus, measurement by an external monitoring apparatus, and estimation of the power consumption described above.

(1.5) Use of Infrastructure

In keeping with increasing environmental concern and the development of power saving technology in recent years, it is conceivable that in the future, it will become easier to acquire power consumption information for each appliance in the home or an office. In such a case, the information processing apparatus 1 would be capable of acquiring and using the power consumption information provided in that way.

4. Method of Calculating Individual Presence Probability $S_{ji}(t)$

Next, a method of calculating the individual presence probability $S_{ji}(t)$, which is the probability that a person i is present in the room j at time t, carried out by the individual presence probability estimating unit 12 will be described.

The individual presence probability estimating unit 12 estimates the location of the person i using one of (2.1) to (2.6)

below and calculates the individual presence probability $S_{ji}(t)$ according to the method described in (2.7) based on such estimation results.

(2.1) Static Method

The individual presence probability estimating unit 12 decides in advance the presence probability of a person for each room j, stores the result as a database, and calculates the presence probability of the person from such database.

More specifically, the presence probability of a person in keeping with conditions such as the time, day of the week, and season is stored in the database. For example, since the child will be out from 08:00 to 15:00 on a weekday, for the period from 08:00 to 15:00 on a weekday, the probability of the child being present in the kids' room is set at 1% and the probability of the child not being present in the kids' room is set at 99%. As another example, on a Sunday morning, the probability that the father will be present in the study is set at 80% and the probability that the father will be present in the living room is set at 20%.

Figure 9:
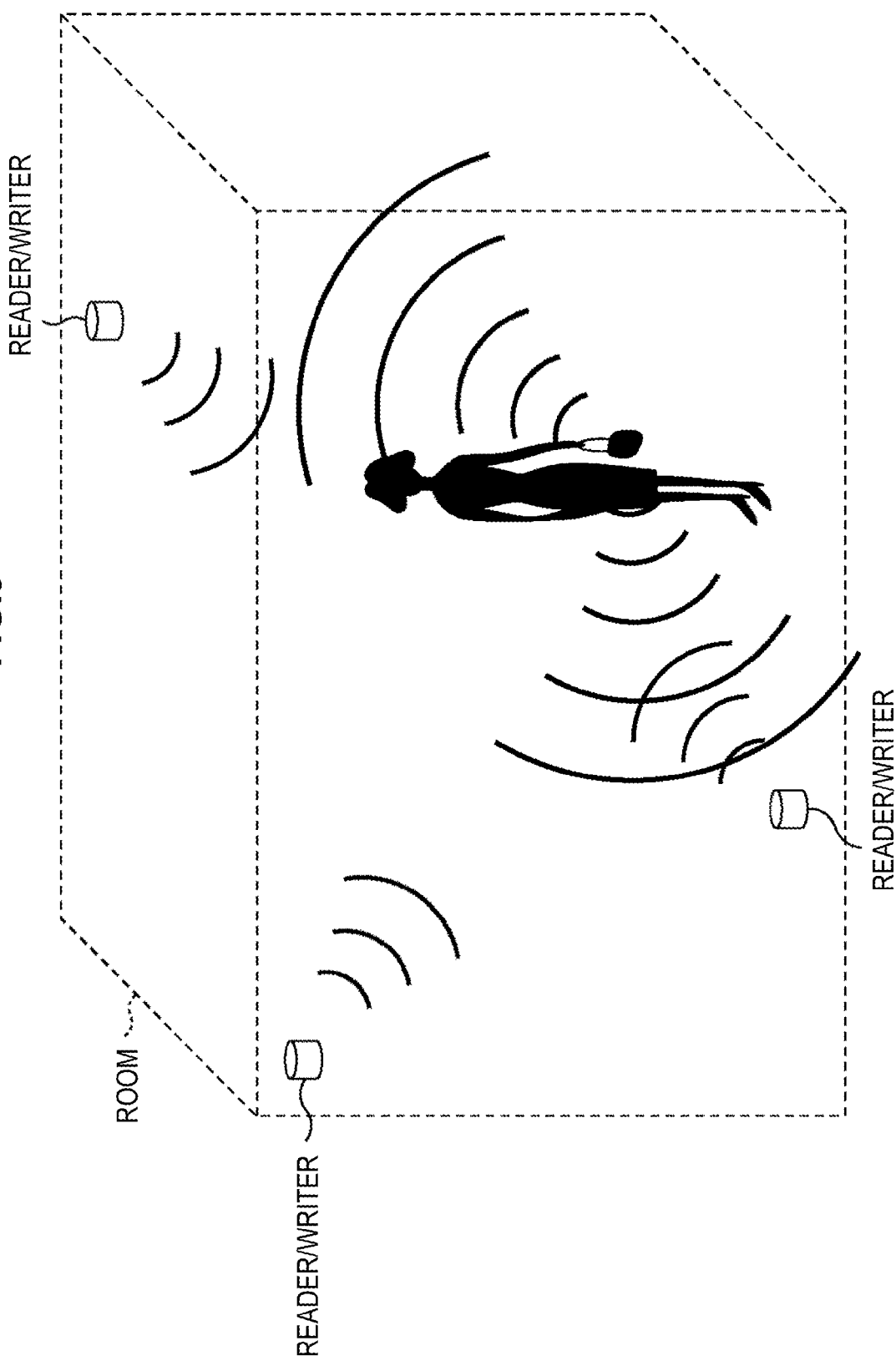
FIG. 9 is a diagram useful in explaining an example of a calculation method for individual presence probabilities.

(2.2) Calculation Method Based on Detection Result of Wireless Communication Device The individual presence probability estimating unit 12 is capable of calculating the presence probability of a person from a detection result of a wireless communication device. That is, as shown in FIG. 9, an RF tag or the like that sends its own ID or the like in response to a polling command is incorporated in an apparatus that is normally carried by a person, such as a watch or a mobile phone or, in the case of an office, an employee ID card. A reader/writer that detects RF tags present in a specified communication range is set up at each location in the home. The individual presence probability estimating unit 12 probabilistically detects the position of a person carrying or wearing an RF tag from appended information such as electrical field intensity when recording and sending back IDs showing RF tags detected by the respective reader/writers, and calculates the presence probability of a person. The number and positions of the set-up reader/writers and the communication range of the reader/writers may be set as appropriate in accordance with the grain for identifying the positions.

Also, a wireless communication device such as Wi-Fi may be used in place of an RF tag device. For example, mobile phones referred to as "smartphones" are normally equipped with a Wi-Fi communication function. A mobile phone equipped with a Wi-Fi communication function receives a radio wave (beacon) emitted by a wireless LAN access point (station), calculates its own position from the received radio wave intensity, and transmits the result to the information processing apparatus 1. The individual presence probability estimating unit 12 probabilistically detects the position of a person who has the mobile phone from the position transmitted from the mobile phone and calculates the presence probability of the person. The layout of wireless LAN access points can be appropriately set in keeping with the grain for identifying the position.

(2.3) Calculation Method based on Detection Result of Presence Sensor

The individual presence probability estimating unit 12 is capable of calculating the presence probability of a person from the detection result of a presence sensor. That is, a presence sensor is disposed in each room and each presence sensor detects the presence of a person and transmits a detection result to the information processing apparatus 1 wirelessly or via wires. In keeping with the room in which a person is detected, the individual presence probability estimating unit 12 assumes that a certain individual is present with a probability decided in advance. According to one example setting, when a person has been detected in the study, the presence of the father is detected with a 90% probability and the presence of the mother is detected with a 10% probability. Based on the detection result described above, it is possible to calculate the presence probability of a person.

(2.4) Method of Calculating from Detection Result of Camera

Figure 10:
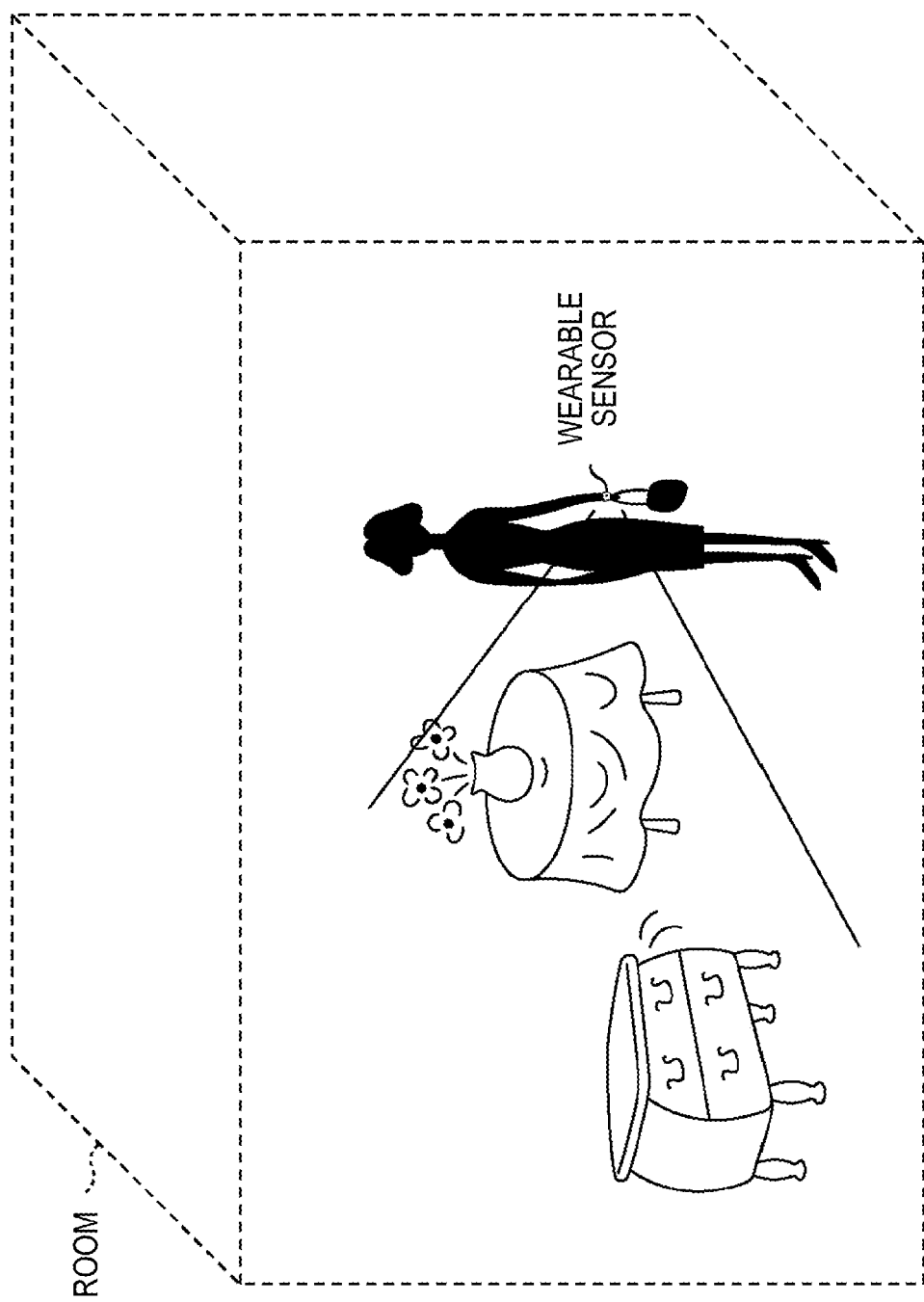
FIG. 10 is a diagram useful in explaining an example of a calculation method for individual presence probabilities.

As shown in FIG. 10, the person wears a camera that picks up video images of the periphery as a wearable sensor that the person normally wears or carries on his/her person and the individual presence probability estimating unit 12 probabilistically estimates the location of the person from the video images picked up by the camera using a technology such as SLAM (Simultaneous Localization and Mapping). An image pickup function of a mobile phone that the person normally carries on his/her person may be used as such a wearable sensor.

(2.5) Method of Calculating from Detection Results of Camera and Microphone

A camera and microphone are disposed at various locations in the home and the individual presence probability estimating unit 12 identifies who is in each room by carrying out facial recognition and voice recognition for example based on an image signal and audio signal acquired by the disposed camera and microphone to calculate the presence probability of a person. As a technology that identifies a user and the position of the user based on an image signal and audio signal acquired by a camera and microphone, it is possible to use the technology disclosed in Japanese Laid-Open Patent Publication No. 2009-31951 filed by the present applicant.

Figure 11:
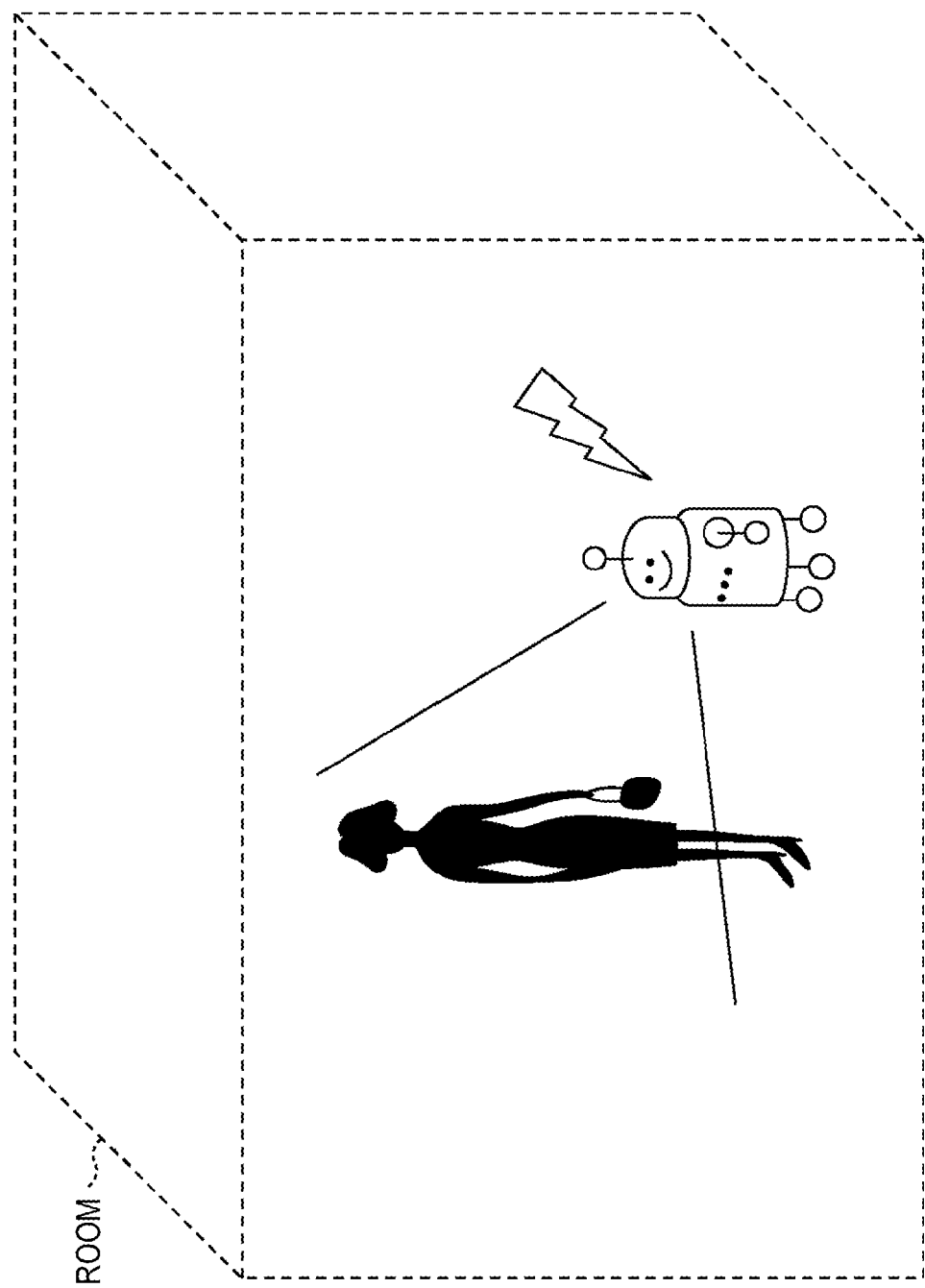
FIG. 11 is a diagram useful in explaining an example of a calculation method for individual presence probabilities.

Note that cameras and microphones may be disposed at fixed locations in the home, or as shown in FIG. 11 for example, an autonomous robot equipped with a camera and a microphone may move regularly or irregularly in the home to acquire an image signal and an audio signal. As a robot apparatus that operates autonomously in accordance with information provided from outside and/or an internal state and identifies a user by detecting a face from input images picked up by the camera, as one example it is possible to use the technology disclosed in Japanese Laid-Open Patent Publication No. 2002-157596 filed by the present applicant. It is also possible to identify the user using only one of image information and audio information.

(2.6) Use of Infrastructure

With the spread of individualism and development of lifelong analysis technology, it is believed that it will become possible to easily use an apparatus that continuously tracks people in a home or office, analyzes motion, predicts behavior, and the like. In such case, the information processing apparatus 1 will be capable of acquiring and using information showing the presence of a person provided from such an apparatus.

(2.7) Calculation of Individual Presence Probability $S_{ji}(t)$

The individual presence probability estimating unit 12 uses the presence probability of a person i estimated using one of (2.1) to (2.6) described above to calculate the individual presence probability $S_{ji}(t)$. Note that for the decision as to which of (2.1) to (2.6) is to be used, it is possible for each person to select a preferred estimation method such as by having the father who usually carries a smartphone to use the estimation method in (2.2). Also, the presence probability may be calculated according to every estimation method capable of being calculated, such calculation results may be combined via processing such as a weighted average, and the results that are finally obtained may then be used as the presence probability of a person.

Using at least one of (2.1) to (2.6) described above, the presence probability of a certain person i is found as $P_i(r_j|p_i)$.

Here, $p_i$ represents a person i in the home and $r_j$ represents a room j. Accordingly, the presence probability $P_t(r_j|p_i)$ represents the probability that a certain person $p_i$ is in the room $r_j$ at the time t. In this case, the individual presence probability estimating unit 12 is capable of outputting the found presence probability $P_t(r_j|p_i)$ without amendment as the individual presence probability $S_{ji}(t)$.

Meanwhile, there are also cases where the presence probability of a certain person i is found as $P_t(p_i|r_j)$. That is, for a given room $r_j$, there are cases where the presence probability of a certain person $p_i$ is found as the probability $P_t(p_i|r_j)$ that a specified person $p_i$ is present in such room at time t. In a case where the presence probability of a person $p_i$ is found according to $P_t(p_i|r_j)$, the individual presence probability estimating unit 12 calculates the presence probability $P_t(r_j|p_i)$ according to Equations (4) and (5) and outputs as the individual presence probability $S_{ji}(t)$.

$$P_t(r_j|p_i) = \frac{P_t(p_i|r_j)}{\sum_j P_t(p_i|r_j) + P_t(p_i|r_{out})} \quad (4)$$

$$P_t(r_j|p_i) = \frac{P_t(p_i|r_j)}{\sum_j P_t(p_i|r_j)}(1 - P_t(p_i|r_{out})) \quad (5)$$

Here, $P_t(p_i|r_{out})$ represents the probability that the person $p_i$ is out at time t (i.e., is outside the house). If the reliability of the probability $P_t(p_i|r_{out})$ that the person is out is extremely high, the presence probability $P_t(r_j|p_i)$ should preferably be calculated according to Equation (5), while if the reliability of the probability $P_t(p_i|r_{out})$ that the person is out is about the same as the other presence probability $P_t(r_j|p_i)$, the other presence probability $P_t(r_j|p_i)$ should preferably be calculated according to Equation (4).

The probability $P_t(p_i|r_{out})$ that the person is out can be calculated with high reliability by disposing the reader/writer described above or a wireless LAN access point, or disposing a camera and/or microphone at the entrance of the house.

5. Method of Calculating Appliance Presence Probability $E_{jk}(t)$

Next, the method of calculating the appliance presence probability $E_{jk}(t)$, which is the probability that the appliance k is present in the room j at time t, carried out by the appliance presence probability estimating unit 13 will be described.

The appliance presence probability estimating unit 13 is capable of calculating the appliance presence probability $E_{jk}(t)$ according to any of the methods in (3.1) to (3.4) below.

(3.1) Static Method

The appliance presence probability $E_{jk}(t)$ of the appliance k for the room j is decided in advance and is stored in a database. For example, a database is stored in which the probability that a television set is present in the living room is 100%, the probability that a refrigerator is present in the kitchen is 100%, the background error is the same probability for every room, and the like. The appliance presence probability estimating unit 13 acquires and calculates the appliance presence probability $E_{jk}(t)$ of the appliance k from such database. Note that the appliance presence probability $E_{jk}(t)$ of the appliance k may be set in the database so as to change in keeping with a behavior pattern of the person according to the time, day of the week, the season, and the like.

(3.2) Calculation Method Based on Detection Result of Wireless Communication Device If the wireless communication device described above in (2.2) is incorporated in each appliance k or is stuck onto the outside instead of being carried or worn by a person, the appliance presence probability estimating unit 13 can calculate the presence probability $E_{jk}(t)$ of the appliance k by detecting such wireless communication device.

(3.3) Calculation Method Using Presence Information for People

From the power consumption $w_k(t)$ of the apparatus k outputted by the appliance power consumption estimating unit 11, it is possible to know the on and off states of the appliance k. It is possible to assume that an on state of the appliance k has been caused by a person present at that time in the home and for the appliance presence probability estimating unit 13 to calculate the appliance presence probability $E_{jk}(t)$ of the appliance k using the presence probability of people. Note that the appliance presence probability $E_{jk}(t)$ is regarded as not depending on time.

More specifically, if a set of times where the appliance k changes from the off state to the on state is set as $T_k$ and the probability $P_t(p_i|r_j)$ that a specified person $p_i$ is present in a certain room $r_j$ at time t is obtained, the appliance presence probability estimating unit 13 calculates the appliance presence probability $E_{jk}(t)$ according to Equation (6) below.

$$E_{jk} = \frac{\rho_{jk} + \sum_{t \in T_k} \sum_i P_t(p_i|r_j)}{\sum_j \left(\rho_{jk} + \sum_{t \in T_k} \sum_i P_t(p_i|r_j)\right)} \quad (6)$$

Alternatively, if, for a certain person $p_i$, the probability $P_t(r_j|p_i)$ that the person $p_i$ is present in the room $r_j$ at time t is obtained, the appliance presence probability estimating unit 13 calculates the appliance presence probability $E_{jk}(t)$ according to Equation (7) below.

$$E_{jk} = \frac{\rho_{jk} + \sum_{t \in T_k} \sum_i P_t(r_j|p_i)}{\sum_j \left(\rho_{jk} + \sum_{t \in T_k} \sum_i P_t(r_j|p_i)\right)} \quad (7)$$

As shown in Equations (6) and (7), the appliance presence probability $E_{jk}(t)$ can be found by summing the individual presence probability $S_{ji}(t)$ ($=P_t(p_i|r_j)=P_t(r_j|p_i)$) when the appliance k enters the on state. Note that the value $\rho_{jk}$ in Equation (6) and Equation (7) is an initial value providing the possibility of the appliance k being present in the room j. The value $\rho_{jk}$ may be the same value (a minute value) for each room or may be set at different values for each room based on prior knowledge.

In the time set $T_k$, it is possible to add not only the times at which the appliance moves from the off state to the on state, but also the times at which the appliance moves from the on state to the off state or the time at which the operation state (operation mode) of the appliance k has changed (the time at which the power consumption greatly changes). In addition, it is possible to stabilize the calculation results by adding not only the times of changes in state but also certain periods before and after such times to the time set $T_k$.

Note that to relax the assumption that the probability does not depend on time, the appliance presence probability $E_{jk}(t)$ may be an equation that gradually follows time. As one example, it is possible to add a function $\gamma(t)(0<\gamma(t)<1)$ that causes attenuation in keeping with the time difference between the present time and the measurement time t to the probability $P_t(p_i|r_j)$ or the probability $Pt(r_j|p_i)$ of Equation (6) and Equation (7).

(3.4) Combination of Above Methods

The appliance presence probability estimating unit 13 is capable of selecting any of (3.1) to (3.3) described above for each appliance k and calculating the appliance presence probability $E_{jk}(t)$. Also, the appliance presence probability $E_{jk}(t)$ may be calculated according to every estimation method capable of being calculated, such calculation results may be combined via processing such as a weighted average, and the results that are finally obtained may then be used as the appliance presence probability $E_{jk}(t)$ of the appliance k.

6. Calculation Method of Responsible Share $R_{ij}(t)$

Next, the calculation method of the responsible share $R_{ij}(t)$, which is the share of the power consumed in the room j for which the person i is responsible, carried out by the responsible share deciding unit 14 will be described.

The responsible share deciding unit 14 is capable of calculating the responsible share $R_{ij}(t)$ according to either of the methods (4.1) and (4.2) below.

(4.1) Static Method

The responsible share deciding unit 14 decides the responsible proportion of each person i for the room j in advance, stores such values as a database, and calculates the responsible share $R_{ij}(t)$ of each person i for the room j by obtaining such values from the database. In the database, as examples it is possible to set the responsible share of the father for the power consumption in the study at 100% and to set the responsible shares of the power consumption in the living room on a Sunday morning as 50% for the father, 40% for the child, and 10% for the mother. It is also possible to set the responsible share $R_{ij}(t)$ of each person i for each room j so as to change based on a behavior pattern of the person in keeping with the time, day of the week, season, and the like.

(4.2) Calculation Method Using Presence Information for People

If the probability $P_t(p_i|r_j)$ that a specified person $p_i$ is present in a certain room $r_j$ at time t is obtained, the responsible share deciding unit 14 may calculate the responsible share $R_{ij}(t)$ of such person pi in keeping with the probability $P_t(p_i|r_j)$ of such person $p_i$ according to Equation (8) below.

$$R_{ij}(t) = \frac{P_t(p_i | r_j) + \varepsilon}{\sum_i (P_t(p_i | r_j) + \varepsilon)} \quad (8)$$

The value $\varepsilon$ in Equation (8) is a microconstant for preventing the denominator from becoming zero. Note that as the method of preventing the denominator from becoming zero, if the term $\Sigma P_t(p_i|r_j)$ of the denominator is a specified threshold $P_{th}$ or below, instead of using the calculation result of Equation (8), the value $R_{ij}(t)$ from the immediately preceding time may be held without amendment. In this case, it is possible to omit $\varepsilon$.

Note that if the presence probability of the person $p_i$ can be calculated using only the probability $P_t(r_j|p_i)$ and not the probability $P_t(p_i|r_j)$, after the probability $P_t(p_i|r_j)$ has been found from the probability $P_t(r_j|p_i)$ according to Equation (9), it is possible to calculate according to Equation (8). In Equation (9) also, the value $\varepsilon$ is a microconstant for preventing the denominator from becoming zero.

$$P_t(p_i | r_j) = \frac{P_t(r_j | p_i) + \varepsilon'}{\sum_i (P_t(r_j | p_i) + \varepsilon')} \quad (9)$$

Figure 3:
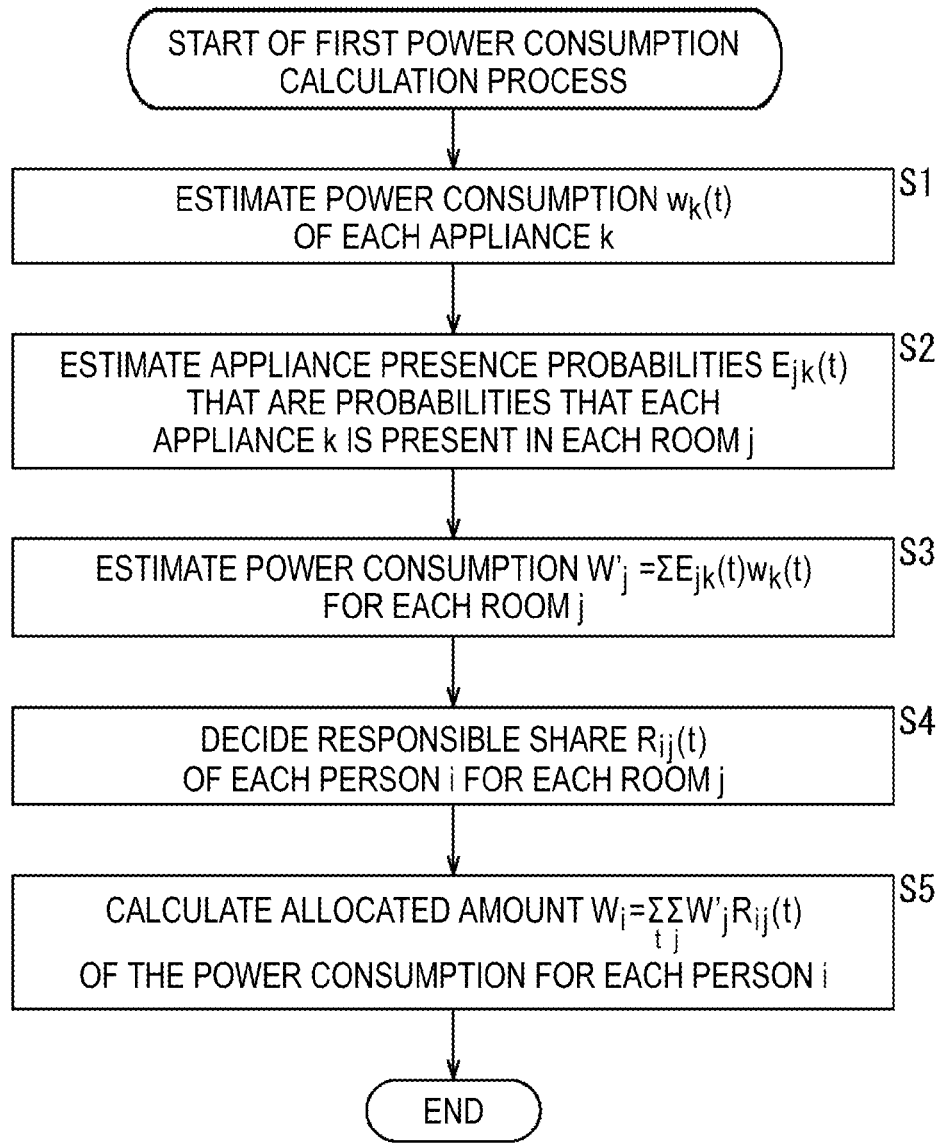
FIG. 3 is a flowchart useful in explaining the first power consumption calculation method.

According to the method described above, the power consumption $w_k(t)$, the individual presence probability $S_{ji}(t)$, the appliance presence probability $E_{jk}(t)$, and the responsible share $R_{ij}(t)$ can all be calculated, and using such calculation results, the calculation process for the power consumption $W_i$ of the individual i described with reference to FIG. 3 or FIG. 5 is carried out.

As described above, according to the information processing apparatus 1, it is possible to calculate the power consumption of each person for each appliance and therefore possible to present "who" used "what appliance" and "by how much". As a result, it is possible for each user to take measures that improve their usage of power and to increase the motivation for saving power.

Also, since it is possible to grasp not only power consumption but also a usage pattern such as the usage time, such information can also be put to uses such as individualization, the grasping of user taste, and behavior prediction. It is possible to specify an appliance that has been left on and is not providing a benefit to anyone, and to promote the effective usage of energy, such as by reducing power used during standby. In addition, since the average number of users is known for each appliance, this can help identify appliances that make extravagant use of power.

7. Example of Power Consumption Estimating Technique

A method that generates and solves a factorial HMM will now be described in brief as an example of a technique that estimates the states (an on state or an off state) of appliances connected to a source of supplied power, such as a power switchboard, from the results of measuring the consumption current at one location at such power source.

Figure 12:
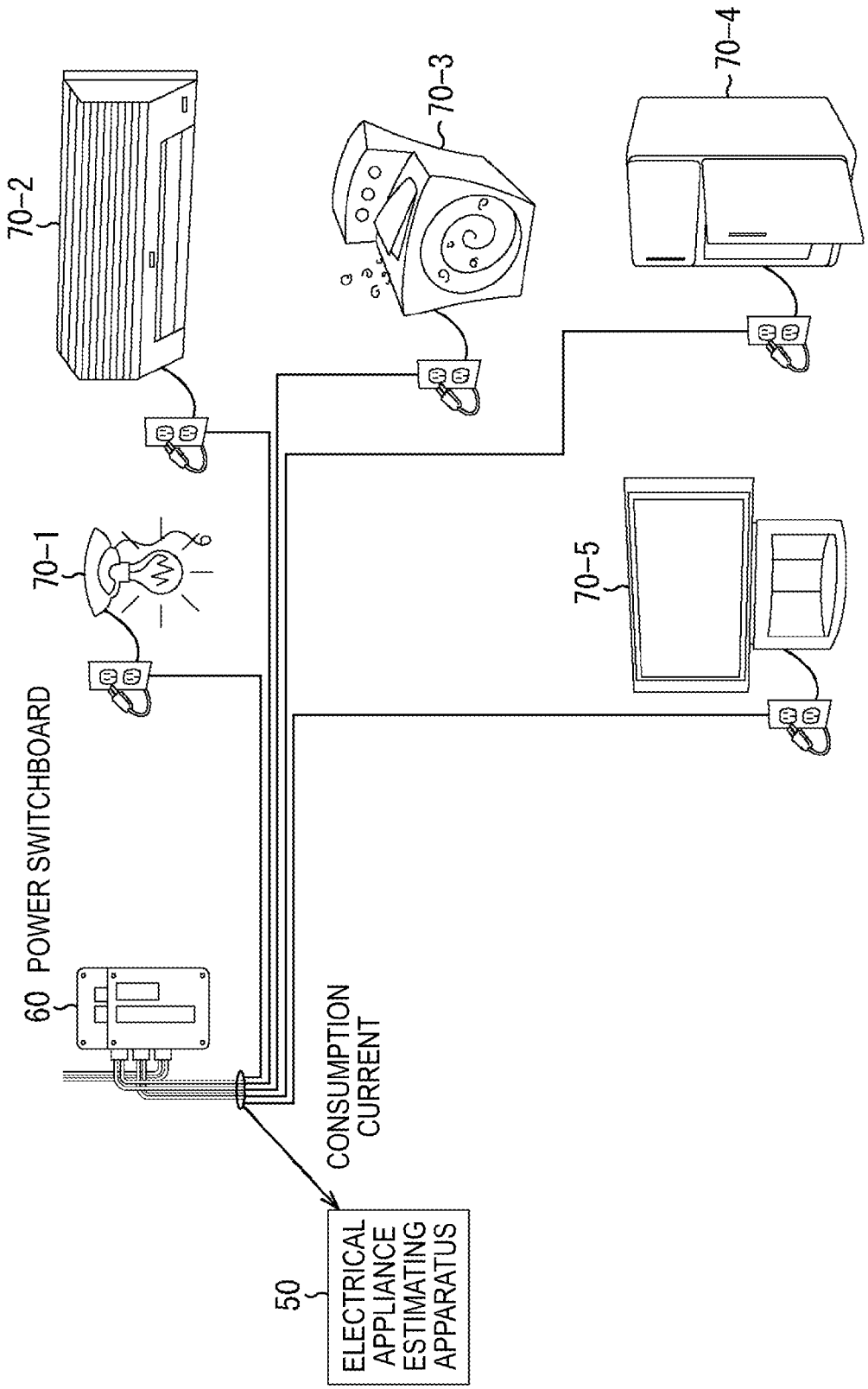
FIG. 12 is a diagram useful in explaining a power consumption estimating technique that uses factorial HMM.

Next, as shown in FIG. 12, an electrical appliance estimating apparatus 50 as the appliance power consumption estimating unit 11 will be described as a device that carries out processing to estimate the operation states of respective electrical appliances 70 using factorial HMM.

That is, the electrical appliance estimating apparatus 50 estimates, on a secondary side of a power switchboard 60, the operation states of a plurality of electrical appliances 70 set up in a plurality of locations in the home by measuring the total consumption current that is the combination of the usage states of the plurality of electrical appliances 70. In FIG. 12, a lighting apparatus (light bulb) 70-1, an air conditioner 70-2, a washing machine 70-3, a refrigerator 70-4, and a television set 70-5 are shown as examples of the electrical appliances 70.

Factorial HMM

First, factorial HMM will be described in brief. FIGS. 13A and 13B are diagrams in which regular HMM and factorial HMM are represented using graphical models.

FIG. 13A is a graphical model representing regular HMM and FIG. 13B is a graphical model representing factorial HMM.

In regular HMM, one state variable $S_t$ corresponds to one observation data $Y_t$ at time t. Regular HMM and factorial HMM differ in that there are a plurality (in FIG. 13, M) of state variables $S_t$, that is, $S_t^{(1)}, S_t^{(2)}, S_t^{(3)}, S_t^{(m)}, \ldots S_t^{(M)}$, and in that one piece of observation data $Y_t$ is generated from such plurality of state variables $S_t^{(1)}$ to $S_t^{(M)}$.

Figure 14:
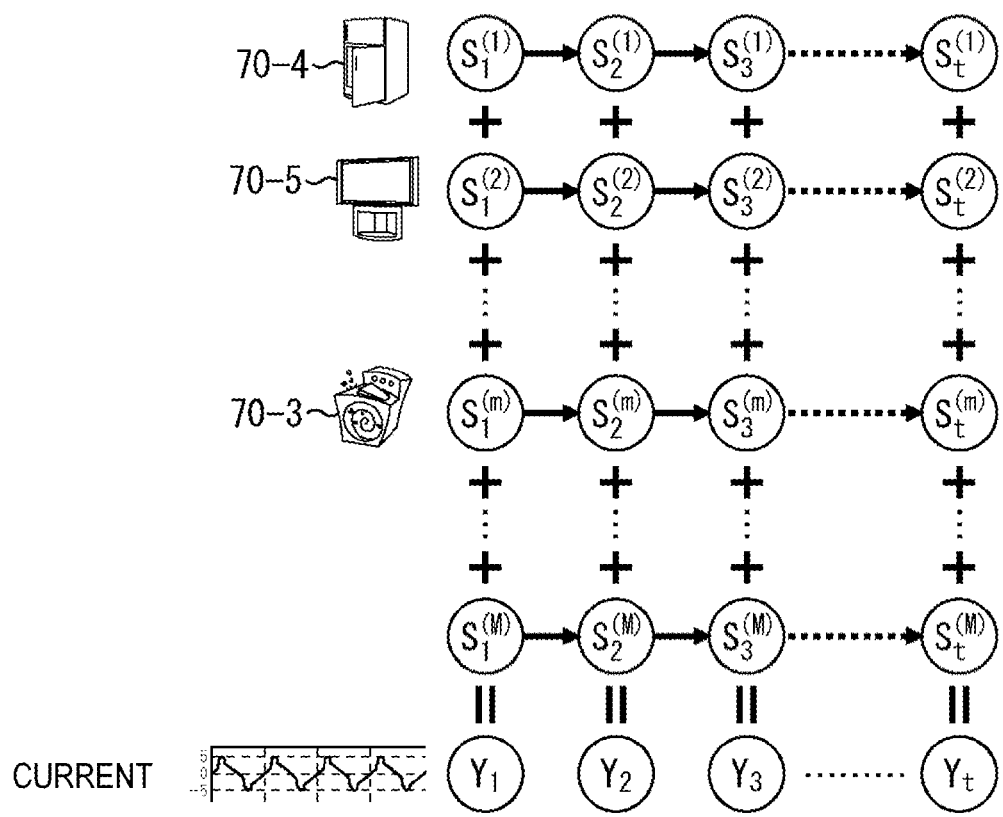
FIG. 14 is a diagram useful in explaining a power consumption estimating technique that uses factorial HMM.

FIG. 14 is a diagram showing the factorial HMM in FIG. 13B in association with the respective electrical appliances 70 shown in FIG. 12.

The M state variables $S^{(1)}$ to $S^{(M)}$ of the factorial HMM correspond to the respective electric apparatuses 70. In addition, the state value of a state variable $S^{(m)}$ corresponds to the state of an electrical appliance 70 (for example, the two states on and off).

More specifically, the state values $S_1^{(1)}$ to $S_t^{(1)}$ in keeping with the passage of time of the first state variable $S^{(1)}$ out of the M state variables $S^{(1)}$ to $S^{(M)}$ correspond to states of a specified electric appliance 70 (for example, the refrigerator 70-4). Similarly, the state values $S_1^{(2)}$ to $S_t^{(2)}$ in keeping with the passage of time of the second state variable $S^{(2)}$ correspond to states of a specified electric appliance 70 (for example, the television set 70-5). In the same way, the state values $S_1^{(m)}$ to $S_t^{(m)}$ in keeping with the passage of time of the $m^{th}$ state variable $S^{(m)}$ correspond to states of a specified electric appliance 70 (for example, the washing machine set 70-3).

In addition, total values of the current consumed due to the combination of usage states of the plurality of electric appliances 70 set up at the respective locations within the home are obtained as observation data $Y_1$ to $Y_t$.

Note that the $m^{th}$ state variable $S^{(m)}$ out of the M state variables $S^{(1)}$ to $S^{(M)}$ will hereinafter be referred to as the "$m^{th}$ factor" or "factor m".

Factorial HMM is described in detail in Zoubin Ghahramani and Michael I. Jordan, "Factorial Hidden Markov Models'," Machine Learning Volume 29, Issue 2-3, November/December 1997.

Next, the estimation of a model parameter in factorial HMM will be described.

If the hidden states for the observation data $\{Y_1, Y_2, Y_3, \ldots, Y_t, \ldots, Y_T\}$ are expressed as $\{S_1, S_2, S_3, \ldots, S_t, \ldots, S_T\}$, the joint probability of a hidden state $S_t$ and observation data $Y_t$ is given by Equation (10) below.

$$P(\{S_t, Y_t\}) = P(S_1)P(Y_1 \mid S_1) \prod_{t=2}^{T} P(S_t \mid S_{t-1})P(Y_t \mid S_t) \quad (10)$$

In Equation 10, $P(S_1)$ represents initial probability, $P(S_t|S_{t-1})$ represents state transition probability, and $P(Y_t|S_t)$ represents observation probability. $P(S_1)$, $P(S_t|S_{t-1})$, and $P(Y_t|S_t)$ in Equation (10) are calculated by Equation (11), Equation (12), and Equation (13), respectively.

$$P(S_1) = \prod_{m=1}^{M} P(S_1^{(m)}) \quad (11)$$

$$= \prod_{m=1}^{M} \pi^{(m)}$$

$$P(S_t \mid S_{t-1}) = \prod_{m=1}^{M} P(S_1^{(m)} \mid S_{t-1}^{(m)}) \quad (12)$$

$$= \prod_{m=1}^{M} A^{(m)}$$

$$P(Y_t \mid S_t) = \text{Normal}(Y_t; \mu_t, C)$$

$$= \frac{1}{\sqrt{(2\pi)^D |C|}} \exp\left(-\frac{1}{2}(Y_t - \mu_t)' C^{-1}(Y_t - \mu_t)\right)$$

-continued
where $$\mu_t = \sum_{m=1}^{M} W^{(m)} S_t^{(m)} \quad (13)$$

Although there are cases where a plurality of factors correspond to one electric appliance 70, as the simplest example, estimation of a model parameter in factorial HMM will be described assuming that one factor corresponds to one electric appliance 70. In a case where one factor corresponds to one electric apparatus 70, the electric apparatus 70 corresponding to the factor m is also referred to as the $m^{th}$ electric appliance 70.

$S_t^{(m)}$ in Equations (11) to (13) represents the state (on, off, high power operation, low power operation, or the like) of the $m^{th}$ electric appliance 70 at time t. If K is the number of states of the $m^{th}$ electric appliance 70, $S_t^{(m)}$ is composed of a K-dimensional vertical vector (a vector with K rows and one column)

The initial probability $P(S1)$ in Equation (11) is calculated by multiplication of M pieces of $\pi^{(m)}$. Here, $\pi^{(m)}$ represents the initial state probability of the $m^{th}$ electric appliance 70, and is a K-dimensional vertical vector.

The state transition probability $P(S_t|S_{t-1})$ in Equation (12) is calculated by multiplication of M pieces of $A^{(m)}$. Here, $A^{(m)}$ represents for example a state transition probability of the $m^{th}$ electric appliance 70 corresponding to a tendency for changes from an on state to an off state or the like, and is composed of a square matrix of K rows and K columns (K×K).

The observation probability $P(Y_t|S_t)$ in Equation (13) is calculated by a multivariate normal distribution with an observation average $\mu_t$ and a covariance matrix C. In Equation (13), a dash (') indicates transposition, and "−1" at upper right indicates a reciprocal. In addition, |C| indicates the absolute value of C.

$W(m)$ in Equation (13) is a parameter of the observation probability $P(Y_t|S_t)$ which corresponds to the pattern of a current waveform consumed by the $m^{th}$ electric appliance 70. Since the pattern of the current waveform differs for each state of the electric appliance 70, $W^{(m)}$ is a matrix of D rows and K columns (D×K) with the number D of dimensions of observation data as the number of rows and with the number K of states as the number of columns.

In the equations, $\mu_t$ denotes an observation average at time t, and is obtained by adding together M column elements of the matrix $W^{(m)}$ which correspond to the state $S_t^{(m)}$. In other words, $\mu_t$ corresponds to an addition of current values corresponding to the states of all of the electric appliances 70. Accordingly, when the observation average $\mu_t$ is close to the observation data $Y_t$ at time t, the model parameter is plausible. The covariance matrix C corresponds to the intensity of noise superimposed on a current pattern, and is assumed to be the same for all the electric appliances 70 at all times.

Figure 15:
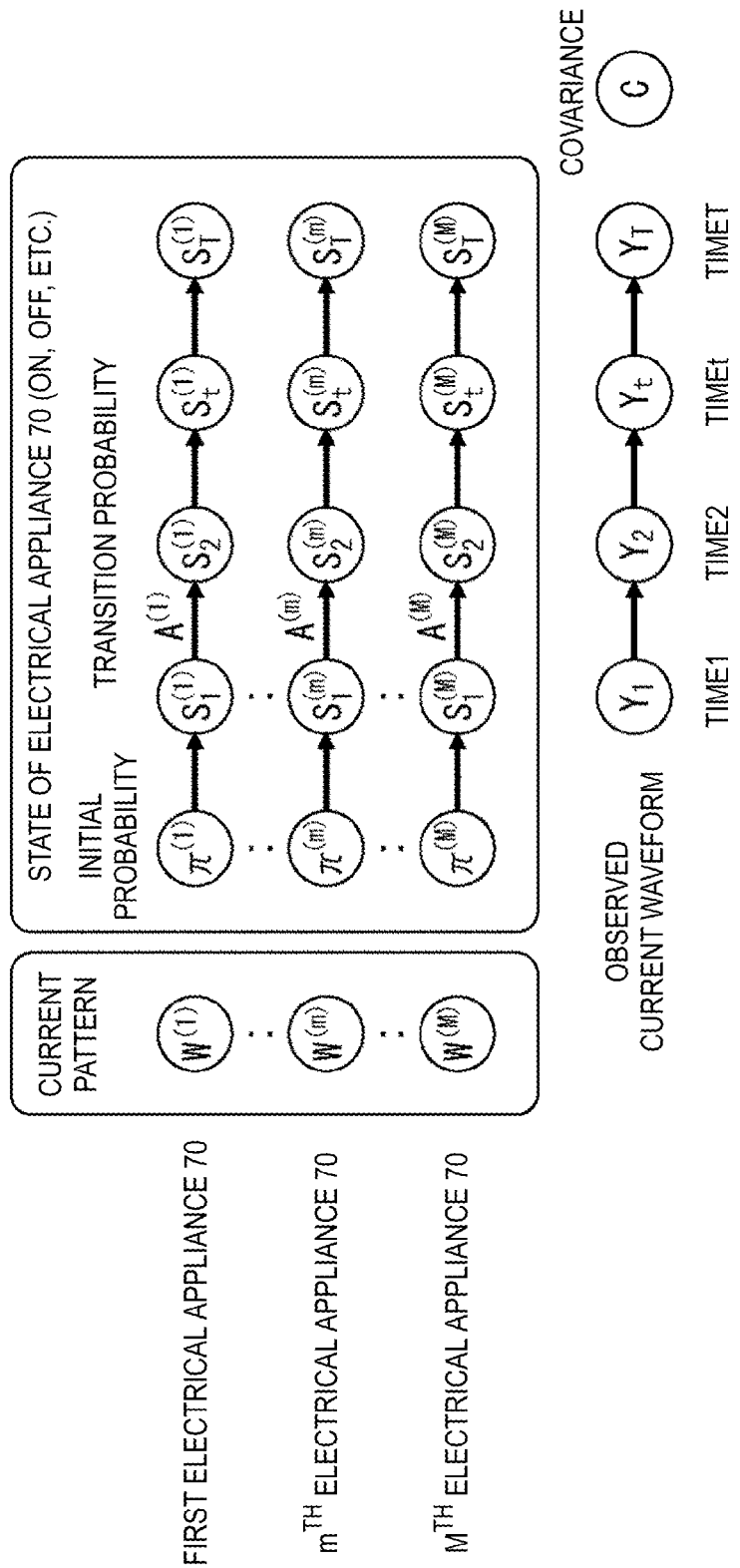
FIG. 15 is a diagram useful in explaining a power consumption estimating technique that uses factorial HMM.

The expression "model parameters" of Factorial HMM refers to the initial state probability $\pi(m)$, the state transition probability $A^{(m)}$, and the observation probability parameter $W(m)$ of the $m^{th}$ electric appliance 70 and the covariance matrix C, with the electrical appliance estimating apparatus 50 estimating the factorial HMM model parameter $\phi=\{\pi(m), A(m), W(m), C\}$. By doing so, since it is possible to estimate the state (on, off, high power state, low power state, or the like) of the $m^{th}$ electrical appliance 70 at time t, it is possible to estimate the power consumption of the respective electrical appliances 70. FIG. 15 shows the correspondence between the factorial HMM model parameters $\Phi=\{\pi^{(m)}, A^{(m)}, W^{(m)}, C\}$ and the states of the electrical appliances 70.

The appliance power consumption estimating unit 11 is capable of estimating the power consumption of each appliance using the power consumption estimating technique described above.

[Configuration Example of Computer]

The series of processes described above can be executed by hardware but can also be executed by software. When the series of processes is executed by software, a program that constructs such software is installed into a computer. Here, the expression "computer" includes a computer in which dedicated hardware is incorporated and a general-purpose personal computer or the like that is capable of executing various functions when various programs are installed.

Figure 16:
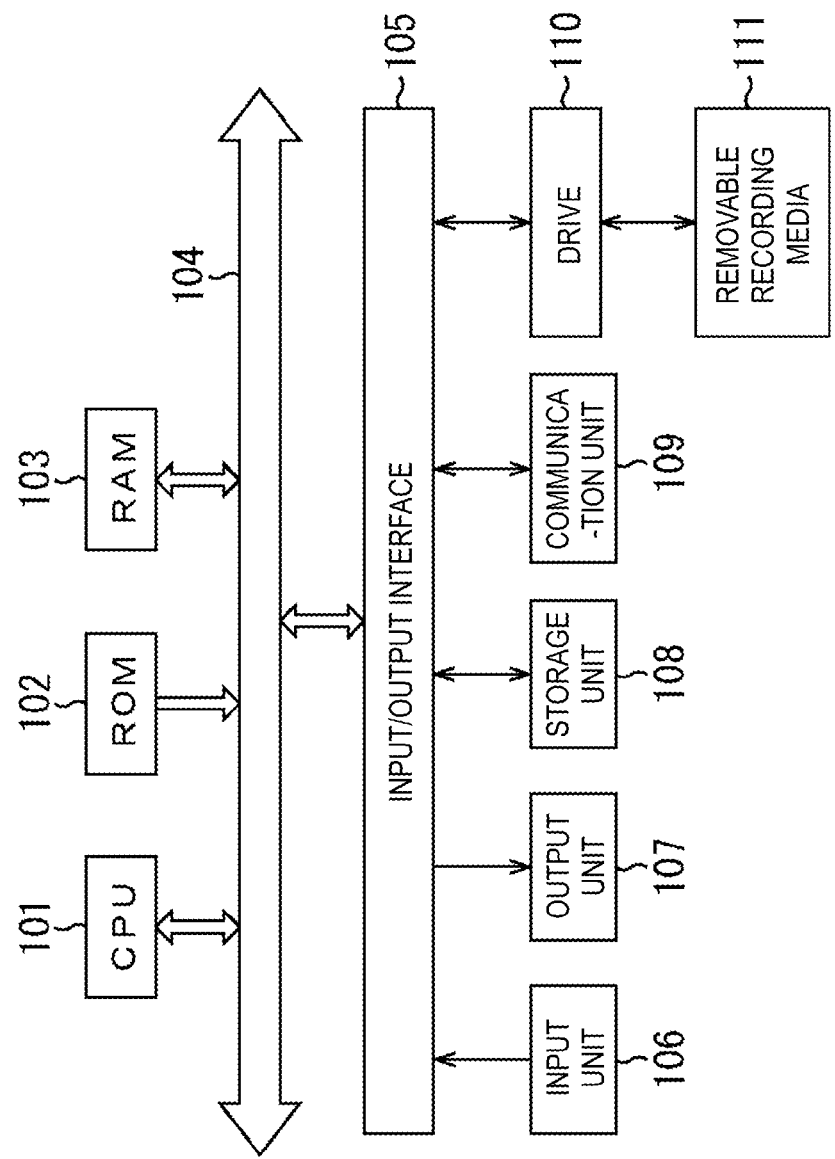
FIG. 16 is a block diagram showing an example configuration of a computer according to an embodiment of the present disclosure.

FIG. 16 is a block diagram showing an example configuration of the hardware of a computer that executes the series of processes described earlier according to a program.

In the computer, a central processing unit (CPU) 101, a read only memory (ROM) 102 and a random access memory (RAM) 103 are mutually connected by a bus 104.

An input/output interface 105 is also connected to the bus 105. An input unit 106, an output unit 107, a storage unit 108, a communication unit 109, and a drive 110 are connected to the input/output interface 105.

The input unit 106 is configured from a keyboard, a mouse, a microphone or the like. The output unit 107 configured from a display, a speaker or the like. The storage unit 108 is configured from a hard disk, a non-volatile memory or the like. The communication unit 109 is configured from a network interface or the like. The drive 110 drives a removable recording media 111 such as a magnetic disk, an optical disk, a magneto-optical disk, a semiconductor memory or the like.

In the computer configured as described above, the CPU 101 loads a program that is stored, for example, in the storage unit 108 onto the RAM 103 via the input/output interface 105 and the bus 104, and executes the program. Thus, the above-described series of processing is performed.

In the computer, by loading the removable recording medium 111 into the drive 110, the program can be installed into the storage unit 108 via the input/output interface 105. It is also possible to receive the program from a wired or wireless transfer medium such as a local area network, the Internet, digital satellite broadcasting, etc., using the communication unit 109 and install the program into the storage unit 108. As another alternative, the program can be installed in advance into the ROM 102 or the storage unit 108.

Note that steps written in the flowcharts accompanying this specification may of course be executed in a time series in the illustrated order, but such steps do not have to be executed in a time series and may be carried out in parallel or at necessary timing, such as when the processes are called.

The embodiment of the present technology is not limited to the above-described embodiment. It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below.

(1)

An information processing apparatus including:

an appliance power consumption estimating unit estimating power consumption of each of a plurality of appliances disposed inside a large region that is divided into a plurality of regions;

an appliance presence probability estimating unit estimating appliance presence probabilities that are probabilities that the respective appliances are present in the respective regions;

a responsible share deciding unit deciding responsible shares that are proportions for respective people when power consumption in each region is shared among people who may be present in the large region; and a power consumption allocating unit calculating an allocated amount of power consumption of each person based on the power consumption of each of the plurality of appliances, the appliance presence probabilities, and the responsible shares.

(2)

The information processing apparatus according to (1), wherein the power consumption allocating unit calculates an allocated amount of power consumption for each person who may be present in the large region by integrating the power consumption and appliance presence probabilities of an appliance and the responsible shares in regions corresponding to the appliance presence probabilities in a specified period for every appliance and every region.

(3)

The information processing apparatus according to (1) or (2), further including:

an individual presence probability estimating unit estimating individual presence probabilities that are the probabilities that each person who may be present in the large region is present in the respective regions at a specified time.

(4)

The information processing apparatus according to (3), wherein the appliance presence probability estimating unit estimates the appliance presence probability by summing the individual presence probabilities when a corresponding appliance enters an on state.

(5)

The information processing apparatus according to (3) or (4), wherein the responsible share deciding unit decides the responsible share of each person in keeping with the individual presence probability of the person.

(6)

The information processing apparatus according to any of (1) to (5), wherein the appliance power consumption estimating unit estimates the power consumption by regarding a background error as one of the appliances.

(7)

An information processing method including:

estimating power consumption of each of a plurality of appliances disposed inside a large region that is divided into a plurality of regions;

estimating appliance presence probabilities that are probabilities that the respective appliances are present in the respective regions;

deciding responsible shares that are proportions for respective people when power consumption in each region is shared among people who may be present in the large region; and calculating an allocated amount of power consumption of each person based on the power consumption of each of the plurality of appliances, the appliance presence probabilities, and the responsible shares.

(8)

A program causing a computer to execute processing including:

estimating power consumption of each of a plurality of appliances disposed inside a large region that is divided into a plurality of regions;

estimating appliance presence probabilities that are probabilities that the respective appliances are present in the respective regions;

deciding responsible shares that are proportions for respective people when power consumption in each region is shared among people who may be present in the large region; and calculating an allocated amount of power consumption of each person based on the power consumption of each of the plurality of appliances, the appliance presence probabilities, and the responsible shares.

The present disclosure contains subject matter related to that disclosed in Japanese Priority Patent Application JP 2011-181169 filed in the Japan Patent Office on Aug. 23, 2011, the entire content of which is hereby incorporated by reference.

What is claimed is:

1. An information processing apparatus comprising:
    an appliance power consumption estimating unit configured to calculate power consumption of each appliance of a plurality of appliances disposed inside a region divided into a plurality of sub regions;
    an appliance presence probability estimating unit configured to calculate an appliance presence probability indicating a probability that a respective appliance of the plurality of appliances is present in a respective sub region of the plurality of sub regions;
    a responsible share deciding unit configured to calculate a proportion of power consumed by each user of a plurality of users when power consumption in each sub region is shared among the plurality of users; and
    a power consumption allocating unit configured to calculate an allocated amount of power consumption for each user based on the calculated power consumption, the appliance presence probability, and the proportion of power consumed.

2. The information processing apparatus according to claim 1, wherein the power consumption allocating unit is configured to calculate the allocated amount of power consumption for each user of the plurality of users present in the region by integrating the power consumption, the appliance presence probability and the proportion of power consumed by a respective user in each sub region of the plurality of sub regions in a specified period for every appliance of the plurality of appliances.

3. The information processing apparatus according to claim 1, further comprising:
    an individual presence probability estimating unit configured to estimate individual presence probabilities that are the probabilities that each user of the plurality of users is present in respective sub regions at a specified time.

4. The information processing apparatus according to claim 3, wherein the appliance presence probability estimating unit is configured to estimate the appliance presence probability by summing the individual presence probabilities when a corresponding appliance enters an on state.

5. The information processing apparatus according to claim 3, wherein the responsible share deciding unit is configured to calculate the proportion of power consumed by each user of plurality of users based on an individual presence probability of the corresponding user.

6. The information processing apparatus according to claim 1, wherein the appliance power consumption estimating unit is configured to calculate the power consumption by regarding a background error as one of the plurality of appliances.

7. An information processing method comprising:
    calculating power consumption of each appliance of a plurality of appliances disposed inside a region divided into a plurality of sub regions;
    calculating an appliance presence probability indicating a probability that a respective appliance of the plurality of appliances is present in a respective sub region of the plurality of sub regions;
    calculate a proportion of power consumed by each user of a plurality of users when power consumption in each sub region is shared among the plurality of users; and
    calculating an allocated amount of power consumption for each user based on the calculated power consumption, the appliance presence probability, and the proportion of power consumed.

8. A non-transitory computer-readable storage medium having stored thereon, a set of computer-executable instructions for causing a computer to perform steps comprising:
    calculating power consumption of each appliance of a plurality of appliances disposed inside a region divided into a plurality of sub regions;
    calculating an appliance presence probability indicating a probability that a respective appliance of the plurality of appliances is present in a respective sub region of the plurality of sub regions;
    calculating a proportion of power consumed by each user of a plurality of users when power consumption in each sub region is shared among the plurality of users; and
    calculating an allocated amount of power consumption for each user based on the calculated power consumption, the appliance presence probability, and the proportion of power consumed.

9. An information processing apparatus comprising:
    an appliance power consumption estimating unit configured to calculate power consumption of each of a plurality of appliances disposed inside a large region that is divided into a plurality of regions;
    an appliance presence probability estimating unit configured to calculate appliance presence probabilities that are probabilities that respective appliances are present in a respective region of the plurality of regions;
    a responsible share deciding unit configured to decide responsible shares that are proportions of power consumed for a respective person when power consumption in each region is shared among a plurality of persons; and
    a power consumption allocating unit configured to calculate an allocated amount of power consumption of each of the plurality of persons based on the power consumption of each of the plurality of appliances, the appliance presence probabilities, and the responsible shares,
    wherein the power consumption allocating unit is configured to calculate the allocated amount of power consumption for each of the plurality of persons present in the large region by integrating the power consumption, the appliance presence probabilities, and the responsible shares in regions corresponding to the appliance presence probabilities in a specified period for each of the plurality of appliances and each of the plurality of regions.

* * * * *